US010109051B1

United States Patent
Natesh et al.

(10) Patent No.: US 10,109,051 B1
(45) Date of Patent: Oct. 23, 2018

(54) ITEM RECOMMENDATION BASED ON FEATURE MATCH

(71) Applicant: A9.com, Inc., Palo Alto, CA (US)

(72) Inventors: Aishwarya Natesh, Mountain View, CA (US); Arnab Sanat Kumar Dhua, Mountain View, CA (US); Ming Du, Redwood City, CA (US); R. Manmatha, San Francisco, CA (US); Colin Jon Taylor, Orinda, CA (US); Mehmet Nejat Tek, Santa Clara, CA (US)

(73) Assignee: A9.com, Inc., Palo Alto, CA (US)

( * ) Notice: Subject to any disclaimer, the term of this patent is extended or adjusted under 35 U.S.C. 154(b) by 31 days.

(21) Appl. No.: 15/196,644

(22) Filed: Jun. 29, 2016

(51) Int. Cl.
| | | |
|---|---|---|
| *G06T 7/00* | (2017.01) | |
| *G06T 7/40* | (2017.01) | |
| *G06K 9/46* | (2006.01) | |
| *G06T 7/60* | (2017.01) | |
| *G06K 9/52* | (2006.01) | |
| *G06K 9/62* | (2006.01) | |
| *G06Q 30/06* | (2012.01) | |

(52) U.S. Cl.
CPC .............. *G06T 7/0012* (2013.01); *G06K 9/46* (2013.01); *G06K 9/4652* (2013.01); *G06K 9/52* (2013.01); *G06K 9/6215* (2013.01); *G06K 9/6267* (2013.01); *G06Q 30/0631* (2013.01); *G06Q 30/0643* (2013.01); *G06T 7/408* (2013.01); *G06T 7/60* (2013.01); *G06K 2009/4666* (2013.01); *G06T 2207/30108* (2013.01)

(58) Field of Classification Search
None
See application file for complete search history.

(56) References Cited

U.S. PATENT DOCUMENTS

| | | | | |
|---|---|---|---|---|
| 2011/0142335 | A1* | 6/2011 | Ghanem | G06F 17/3025 382/165 |
| 2013/0282712 | A1* | 10/2013 | Brandt | G06F 17/30277 707/731 |
| 2014/0314313 | A1* | 10/2014 | Kennedy | G06T 7/0079 382/165 |

* cited by examiner

*Primary Examiner* — Delomia L Gilliard
(74) *Attorney, Agent, or Firm* — Hogan Lovells US LLP

(57) ABSTRACT

Images may be analyzed to determine a visually cohesive color palette, for example by comparing a subset of the colors most frequently appearing in the image to a plurality of color schemes (e.g., complementary, analogous, etc.), and potentially modifying one or more of the subset of colors to more accurately fit the selected color scheme. Various regions of the image are selected and portions of the regions having one or more colors of the color palette are extracted and classified to generate and compare feature vectors of the patches to previously-determined feature vectors of items to identify visually similar items. The visually similar items are selected for presentation in various ways, such as by choosing an outfit of visually-similar apparel items based on the locations of the corresponding colors in the image, etc.

20 Claims, 16 Drawing Sheets

ITEM RECOMMENDATION BASED ON FEATURE MATCH

BACKGROUND

Users are increasingly utilizing electronic devices to obtain various types of information. For example, a user wanting to purchase a product, such as an apparel item, might access a web site, such as an electronic marketplace, in order to search the types of apparel items offered through that marketplace. Users may undertake such searching based on something in the real world that provides inspiration, such as a color of a painting, a texture of a fabric, etc., and users may desire to find apparel (or other) items that have a degree of visual similarity to the source of their inspiration.

BRIEF DESCRIPTION OF THE DRAWINGS

Various embodiments in accordance with the present disclosure will be described with reference to the drawings, in which.

DETAILED DESCRIPTION

Figure 1A:
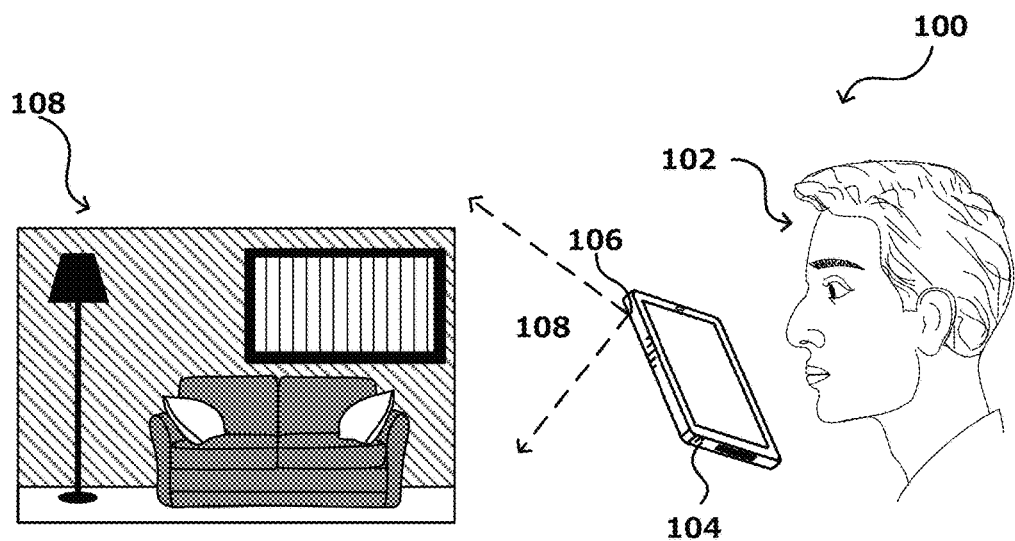
FIGS. 1A-1B illustrate an example process in which a user can attempt to capture an image in an attempt to locate items that are visually similar to aspects represented in the image, in accordance with various embodiments.

Systems, devices and methods in accordance with various embodiments of the present disclosure may overcome one or more of the aforementioned and other deficiencies experienced in conventional approaches for managing user interaction with search results. In particular, various embodiments enable analysis of an image to determine various features of the image and a determination of visually similar items in an electronic catalog of items based on a comparison of the image features with features of the catalog items.

For example, a user may obtain an image of an item and/or an environment from which the user would like to use as inspiration for finding visually similar items, such as apparel, furniture, artwork, etc. A user may take a picture, shoot video, provide live streaming video, etc. of the inspiration with their electronic device. An image from the interaction is selected for analysis, and a listing of visual attributes in the image is generated; for example, all color values associated with some number of pixels comprising the image. While the visual attributes are described herein mainly in the context of color, it should be understood that the approaches are not so limited; for example, a visual attribute may comprise color, texture, surface pattern, material, lighting field, spectral properties, reflectance properties, etc. According to various embodiments, a visual characteristic of the image that may be identified may have feature vectors describing the visual characteristic extracted and used to identify visually similar items. With regard to color as the visual attribute, in some embodiments, the pixels are classified (e.g., quantized) in order to reduce the number of color values to a smaller set. For example, there may be many different color values associated with pixels in the image that all correspond to some variant of a particular color, such as red. While "red" may have a color value of [255,0,0] (in the RGB color space), some pixels may have a color value of 255,1,1, which while not technically "red," is visually similar enough to red that the two values may be combined into a single "bucket" of "red" color values.

According to an embodiment, once the color values of the pixels are reduced to a smaller set, a histogram of the smaller set of colors is generated to identify a frequency at which each of the smaller set of colors appear in pixels of the image. Based on the frequency identified in the histogram data, another set of the most-frequently appearing colors is identified, although in various embodiments, one or more other or additional criteria may be used to select colors in the image, and some other characteristic corresponding to pixels in the image may be used, such as texture values, etc. Based on the final set of colors, a color scheme (or paradigm) is determined that is an acceptable fit to the final set of colors. This may be determined, for example, by generating a type of similarity metric that identifies how good a fit each potential color scheme is to the final set of colors. There may be any number of potential color schemes utilized in the comparison, as discussed herein. Once a potential color scheme is determined, then some of the colors in the final set may be modified in order to better fit the paradigm; for example, in an example where a complementary color scheme is selected, the two colors identified as complementary may not be exactly opposite each other on a color wheel, as is optimal in a complementary color scheme, so one or both of the two colors may be modified (for example, changing a RBG color value of a red color from [255,0,1] to [255,0,0] to better fit a green color that is [0,255,0]). In various embodiments, a user could change one or more of the colors in the final set or the scheme, and the selected scheme or potential scheme may be informed by data comprising information about the user, such as purchase history, customer segments, etc.

Once the final set of colors are determined based on the color scheme (i.e., the "color palette"), various regions in the image where those colors appear may be identified and a portion of the image in that region (e.g., a "patch") extracted for submission to a classifier. For example, the image may be divided into multiple sections, a color of the palette appearing most often in the section identified, and a patch extracted from that section to represent that color in the palette. Other approaches for dividing images are discussed further herein. The extracted patches are then resized if necessary and submitted to a classifier (e.g., a convolutional neural network (CNN) model used in machine learning, etc.) in order to extract feature vectors (feature vectors may be extracted from the layer before the classification layer) that describe a quality and/or characteristic of the image (e.g., color, texture, pattern, etc.).

In order to find visually similar items to the image, various embodiments use a classifier to identify and store feature vectors for various items, such as apparel items in an electronic marketplace. In the example of apparel items, one or more images associated with an item may be processed as described further herein (e.g., cropped, padded, resized, etc.) in order to obtain feature vectors for the item, which are stored and compared (e.g., on-demand) to the feature vectors determined from the image obtained from the user, in order to determine visually similar items. For example, a distance measure (e.g., Euclidean) is utilized to match a feature vector associated with a patch with feature vectors extracted from the apparel items. Items close in distance (e.g., within a threshold distance or value) will have visual similarity to the image (e.g. color similarity, texture similarity, pattern similarity, etc.).

According to various embodiments, once items having a visual similarity to the image are obtained, various approaches to selecting one or more of the visually similar items may be performed. For example, if the image was provided by a customer of an electronic marketplace, her purchase history may be utilized to pick an item for presentation. A customer who has purchased a dress previously may be presented with a dress having color feature vectors as close to the color feature vectors from the image as possible (other feature vectors may be used as well, such as texture, pattern, etc.). A customer may also be presented with a variety of items having visual similarity. In some embodiments, multiple items that form a cohesive unit (e.g., an outfit of apparel items, a selection of furniture, accessories, etc. for a room, etc.) may be identified based on their visual similarity to one or more feature vectors extracted from the image. For example, apparel items that best match the feature vectors may be presented. In some embodiments, items may be selected based on various additional criteria, such as matching a location from which a patch was extracted from the image with a "location" associated with the item; for example, a hat may be associated with data indicating that it is worn on a person's head (i.e., at a particular vertical position/location on a body), and this data may be used to pick visually similar hats to a patch that is extracted from the top of an image. If two or more visually similar items are each associated with a similar location of an image, the location of the image having more pixels of the respective color described by the feature vector (e.g., of the palette) may be used to obtain a visually similar apparel item that is a "main item" such as a dress or shirt, and the feature vector of the other location of the image may be used to obtain a visually similar "accessory" item such as a watch or earrings.

According to various embodiments, the corpus of potentially visually similar items (e.g., apparel items in an electronic marketplace) may be associated with one or more categories (e.g., color, brand, wear size, item size, etc.), which may be used to select one or more visually similar items. For example, if a particular color/texture/pattern is more common in a particular category (e.g., "blue" or "jeans texture," etc. in the "jeans" category), then that category may be assigned a higher probability for being selected when that color appears in a region of the image (i.e., in the palette). A probability map relating to color and category and may generated, for example by using popular item identifiers. Purchase similarity data may also be used to refine a list of visually similar items that may be presented to a user. For example, if there are 10 blue shirts and 10 khaki pants in the potential presentation of visually similar items, and two of them have been purchased together most often, then those two particular items may be designated for presentation to the user.

According to various embodiments, items with associated images selected as visually similar to a query image may be placed (e.g., superimposed, blended, etc.) into the image, for example by masking out any non-appropriate colored background of the item image and inserting the item image into the query image. The item image may be inserted at a particular location of the query image corresponding to or matching the areas in the query image that inspired the item selection (e.g., regions of the query image with a particular color are matched to areas of the item image having corresponding colors). For example, a picture with 5 regions, each having a patch extracted from it associated with one of 5 colors in the color palette ultimately selected for the query image as described herein (e.g., using a color scheme, modifying one or more colors to match the color scheme, etc.), may have the 5 regions existing in some positional relation. As an example, the 5 regions may be vertically stacked on top of each other, from top to bottom in the query image. If the visually similar item that is selected as a result of the techniques described herein has the 5 colors in it in the same vertical order as they appear in the query image, then the item image may be positioned in the query image such that the colors are positionally aligned.

According to an embodiment, a face may be detected in the query image, and as a result, visually similar apparel items may be identified and presented as recommendations to the user that allow the person in the query image to "blend" into their surroundings. For example, a person in the query image whose face is identified (or any other body part indicating a person is in the query image) may be analyzed to determine how much of their body is showing, and visually-similar apparel items may be presented that are appropriate to allow the person to blend into their surroundings. For example, if only a person's torso is identified in the query image, then shirts that are visually similar to the background may be recommended, while if a person's full body is present, then a shirt and pants, among others, may be recommended as visually similar to the background.

By presenting visually similar items to a user as a result of obtaining an image, the user does not have to perform time- and resource-intensive searching in order to identify items that are inspired by the user's query image. For example, a user may have to do a search for a particular apparel type, and the click on numerous individual items in order to see images that may correspond to the appropriate colors based on the user's desires. In addition to taking the user's time, the inefficient current approaches to finding visually similar items causes numerous database accesses at an electronic marketplace, consumes tremendous bandwidth, and requires an electronic marketplace to not only serve, but store (and create, in some cases) a great deal of images in many different color variations for each of their items (e.g., shirts) so that a user can find an image of the item in the color they desire.

Accordingly, approaches in accordance with various embodiments improve the operation and performance of computing devices, such as both client devices and shared resource electronic environments (e.g., servers in a cloud infrastructure, such as at an electronic marketplace), for example by requiring fewer resources in order to allow users to search for visually similar items. The approaches described herein further improve technology related to, among others, cloud computing, shared resource allocation, electronic marketplaces, searching techniques, and electronic commerce by optimizing searches for visually similar items and making the searches more accurate.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Figure 1B:
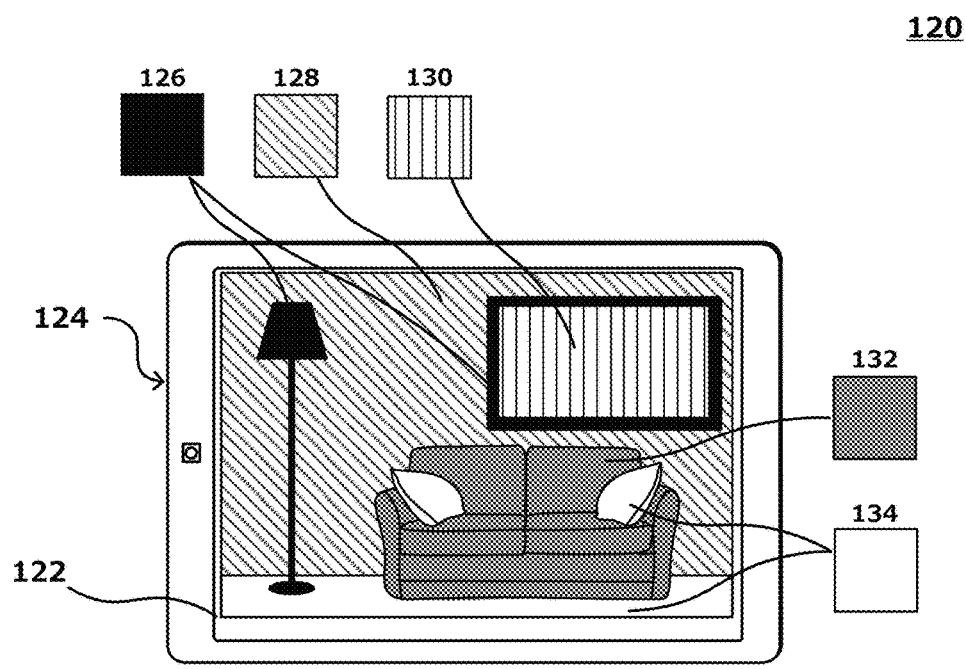

FIGS. 1A-1B illustrate an example process in which a user can attempt to capture an image in an attempt to locate items that are visually similar to aspects represented in the image, in accordance with various embodiments. FIG. 1A illustrates an example situation 100 in which a user 102 is acquiring image data in accordance with various embodiments. Although a portable computing device 104 (e.g., a smart phone or tablet computer) is shown, it should be understood that various other types of electronic devices that are capable of determining and processing input can be used as well in accordance with various embodiments. These devices can include, for example, notebook computers, personal data assistants, e-book readers, cellular phones, video gaming consoles or controllers, smart televisions, set top boxes, a wearable computer (e.g., a smart watch or glasses), and portable media players, among others. In this example, the computing device 104 has at least one camera 106 (or other image capture sensor or element) operable to perform functions such as image and/or video capture. Each camera may be, for example, a charge-coupled device (CCD), a motion detection sensor, or an infrared sensor, or can utilize another appropriate image capturing technology. In this example, the user can position the device such that a scene of interest 108 is within a field of view 108 of the at least one camera 106 on the computing device. The camera might capture video, such that a "live" view of the captured video information can be displayed on a display screen of a computing device. In other embodiments, the camera might capture a still image 122 (as illustrated in FIG. 1B) showing a representation of the scene(s) of interest. In yet other embodiments, the image can be obtained in any one of a number of different ways, as may include downloading or otherwise obtaining the image. In at least some embodiments, the image and/or a frame of the video can be analyzed, such as by analyzing on the device or uploading across a network to a service for analyzing image content.

In the example situation 120 of FIG. 1B, an image 122 of the scene of interest 108 captured in FIG. 1A is displayed on a display screen of a computing device 124, which could be the same computing device 104 as in FIG. 1A or a different device. In the image 122, there are pixels comprising the image that are made up of numerous colors. Example colors 126-134 are illustrated in FIG. 1B, each example color 126-134 of a pixel at various location in the image 122 being represented by a pattern or solid tint in the example illustration of FIG. 1B; however, it should be understood that this is merely for convenience of providing clarity in a black and white illustration. While the example colors 126-134 of FIG. 1B will be referred to several times herein, it should be further understood that these are merely a subset of the colors that may appear in an actual image.

According to an embodiment, the pixels in the scene of interest 108 represented in the image 122 are identified according to a characteristic. While a color of pixels will be discussed as the characteristic by which the examples in FIG. 1B and subsequent figures are identified and processed, it is understood that images and/or pixels may comprise numerous visual attributes, such as color, texture, pattern, etc., as mentioned earlier and further herein. Once the colors of the pixels in the image 122 are identified, the pixels may be classified or quantized down to a smaller set of colors. For example, while the original image 122 may contain pixels of 1,000 different color values (e.g., as defined by a particular color space), the 1,000 colors are quantized into buckets so that some number of smaller representative colors remain. For example, there may be 100 different color values of pixels in the image 122 that correspond to some shade of red, in which case the 100 different color values are placed in a "bucket" corresponding to a single value of "red" in a particular color space. The quantization is performed such that the entire range of color values in the image 122 is grouped into a smaller set of colors, which smaller set may comprise a threshold number assigned by a user, by default, or automatically based on various information, such as the complexity of the image 122, the number of colors in the image 122, the capabilities of a device processing the image 122, etc. The reduced set of colors is then provided to a subsequent step in the example process as illustrated in FIGS. 2A-2F.

Figure 2A:
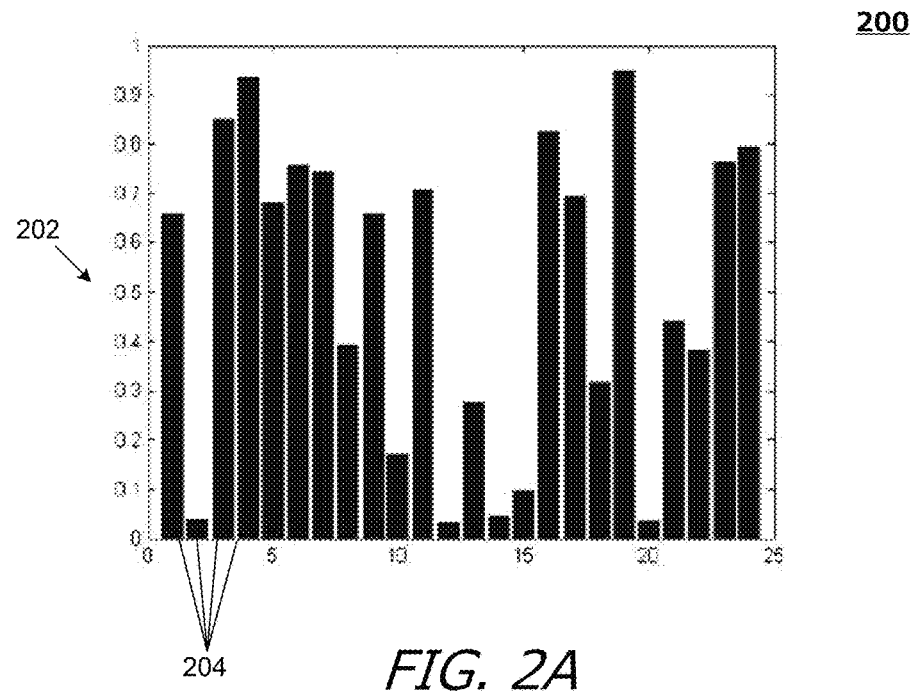
FIGS. 2A-2F illustrate an example approach to analyzing an image to determine visually similar items, in accordance with various embodiments.
Figure 2B:
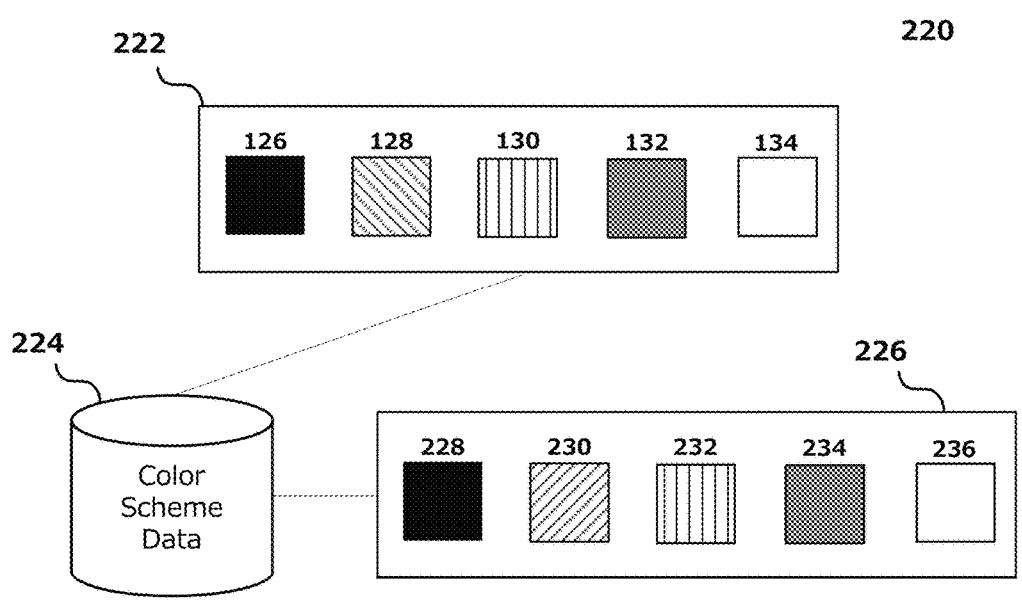

FIGS. 2A-2F illustrate an example approach to analyzing an image to determine visually similar items, in accordance with various embodiments. It should be understood that reference numbers are carried over between figures for similar components for purposes of explanation, but that such use should not be interpreted as a limitation on the various embodiments. In the example 200 of FIG. 2A, an example histogram 202 has been generated such that the reduced set of color values 204 are on the horizontal axis and a number of pixels corresponding to each of the reduced set of color values are on the vertical axis. In various embodiments in which histogram data or a similar data set is generated, histogram data may be utilized for various purposes, such as parsing a color space. Based on the histogram data, it is determined which of the reduced set of color values appears in the image the most (i.e., how many pixels has a color value corresponding to each of the reduced set of color values). An even smaller set of color values (herein, the "color palette") 222 is selected based on the histogram data 202, which is illustrated in FIG. 2B and subsequent figures by colors 126-134. According to various embodiments, the color palette of color values 222 may be presented to a user, and input may be received that operates to change or replace any or all of the colors 126-134 in the color palette 222.

In the example 220 of FIG. 2B, the color palette is compared to color scheme data 224 in order to identify a particular color scheme 226 (or "color paradigm") that is most appropriate for the color palette 222 of colors 126-134, which may comprise a color scheme 226 that comprises scheme colors 228-236 that are closest to the color palette 222. According to various embodiments, a color scheme is utilized in design as "rules" that assist designers in picking colors that are visually cohesive. In color theory, a color scheme is the choice of colors used in design for a range of media. Color schemes are often described in terms of logical combinations of colors on a color wheel. Color schemes are used to create style and appeal. Colors that create an aesthetic feeling when used together will commonly accompany each other in color schemes. A basic color scheme will use two colors that look appealing together. For example, an "achromatic" color scheme (e.g. the use of a white background with black text) is an example of a basic and commonly default color scheme in web design. More advanced color schemes involve several related colors. In addition to an achromatic color scheme, other example color schemes contemplated in various embodiments (e.g., stored in color scheme date 224 for comparison to a color palette 222) may include complementary, analogous, monochromatic, triadic, split-complementary, rectangle (tetradic), square, etc.

In various embodiments, the color scheme data 224 may not comprise various colors arranged together as in element 226, but may comprise rules which are analyzed with respect to the color values represented by the color palette 222. For example, a color scheme that calls for two of the colors in the arrangement of colors to be exactly opposite on a color wheel versus a color scheme that calls for two of the colors in the arrangement of colors to be exactly 45 degrees apart from each other on a color wheel may be analyzed to see which color scheme fits best with a color palette 222 wherein no color is more than 45 degrees apart from each other, in which case the color scheme that calls for two of the colors in the arrangement of colors to be exactly 45 degrees apart is a "better fit" than the other example color scheme, and would be selected if the choice were between the two schemes; however, in various embodiments, the colors 126-134 in the color palette 222 may be modified in order to match the selected color scheme 226 exactly (or come closer as a fit than the unmodified color palette 222 in some embodiments if an exact match is unobtainable or unadvisable).

In the example 220 of FIG. 2B, all the colors 126-134 of the color palette 222 match the colors 228-236 of the color scheme 226 except for one color (color 128 vs. color 230). In the example 240 of FIG. 2C, an example embodiment is illustrated wherein the mismatched color 128 of the color palette 222 may be modified 128A in order to match the color 230 of the color scheme 226. As a result, as illustrated in the example 250 of FIG. 2D. the color palette 222 is now a match to the color scheme 226 once the mismatched color 128 is replaced by the modified color 128A in the color palette 222. According to various embodiments, the color palette 222 and the color scheme 226 may be presented to a user, and input received modifying one or all of the colors in either or both the color palette 222 or the color scheme 226, as well as receiving input changing the color scheme 226 to another color scheme (as represented in the color scheme data 224, for example) entirely. In some embodiments, once a user makes a change to the color scheme 226, then an automatic change is made to one or more colors of the color palette in order to best match the newly-selected color scheme.

Figure 2C:
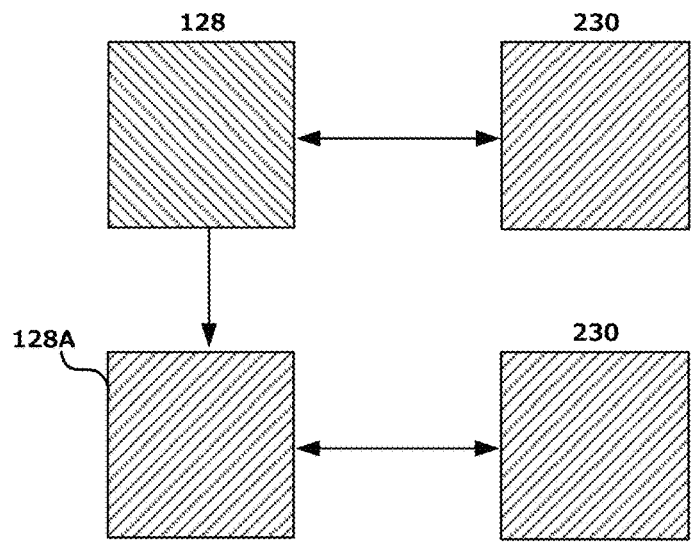
Figure 2D:
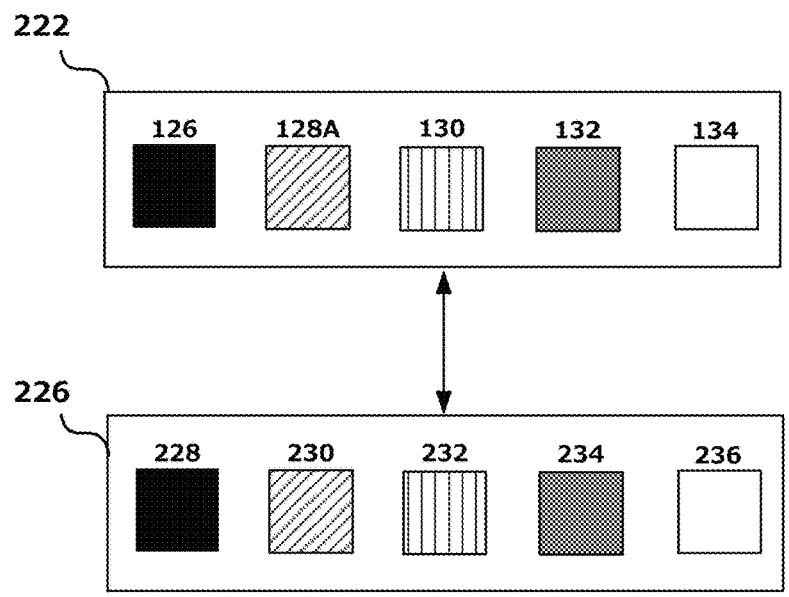
Figure 2E:
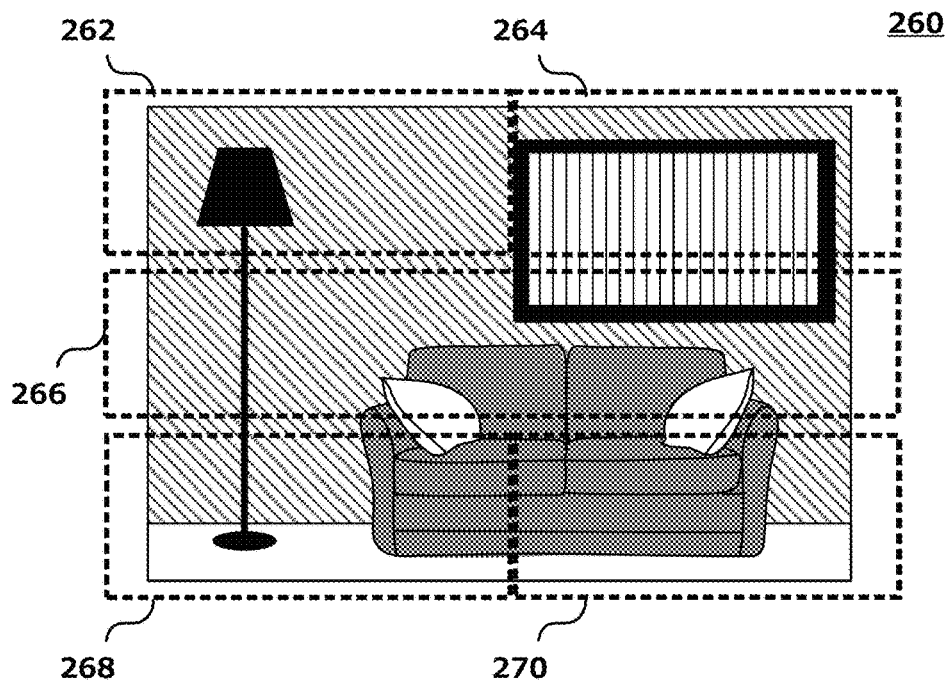
Figure 2F:
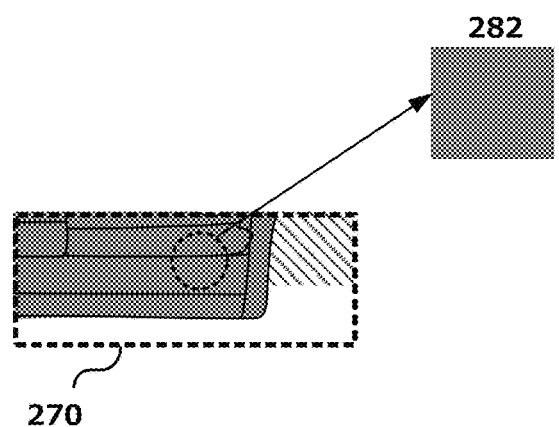

According to an embodiment, once the color palette 222 is identified, then the image 122 may be segmented into various regions 262-270, as illustrated in the example 260 of FIG. 2E. For example, the regions 262-270 of the image 122 where the colors of the color palette 222 appear. This may be accomplished in one of numerous ways; for example, the image may be split into some number of sections (as in the example 260 of FIG. 2E), the sections being of equal or unequal area, overlapping or not, etc. For example, the image 222 may be split into five regions: two at the top, two at the bottom, and one in the middle. The colors of the color palette 222 appearing most in each section are identified, and a patch 282 is extracted from one of the sections 270 to represent one color in the color palette 222, as in the example 280 of FIG. 2F. In various embodiments, if two sections have the same color, only one is used, and one of the other sections with more colors may be subdivided into two (or more) sub-regions.

In another example, regions of the image may be selected for different colors that are as far apart as possible, and a patch 282 extracted from these regions. Also, the largest regions for different colors may be selected and as large a patch 282 as possible extracted, which may then be re-sized to a smaller, usable size. In another example, regions may be picked for different colors that have the most interesting (e.g., complex, highest energy, etc.) texture or pattern, which may be determined for example by studying the edges or the texture energy.

According to various embodiments, a deep learnt color model (e.g., a classifier comprising a neural network, etc.) as described further herein may be utilized to extract feature vectors from the image 122 and use them to identify visually similar items. For example, the extracted patches 282 as described above may be resized if necessary and fed into a classifier (e.g., a deep learnt color model), and a feature vector extracted from a layer before the classification layer. Items, such as those in an electronic catalog/marketplace that are to be matched as visually similar to the image 122, have had feature vectors (e.g., color feature vectors) pre-extracted using the same classifier and stored for lookup purposes, for example in a database in an electronic environment, as described further herein, such as with regard to FIGS. 7-11.

A distance measure (e.g., Euclidean) is used to match the feature vectors from a patch 282 with the stored feature vectors extracted from items, such as apparel items in an electronic marketplace. Apparel items (using this example) that are close in distance will have a similar color "story" to the patch and therefore have a degree of visual similarity, which may be measured by the distance for matching purposes, for example as processed into a similarity score, likeness threshold, or some other measure. In various embodiments, other features such as patterns may be extracted from the image in order to find items from the electronic marketplace with the most similar patterns. For example, an approach to extract a pattern feature vector from an image may use a CNN that has been trained on a pattern classification problem. The deep network is trained to differentiate between various fashion pattern classes such as stripes, plaids, solids, floral, tie-dye, geometric, etc. The feature vector layer from such a CNN provides the ability to find distances between different patterns. Once the extracted image regions from the input image are passed through the CNN, the feature vectors may be used to identify items with the most similar patterns.

Figure 3A:
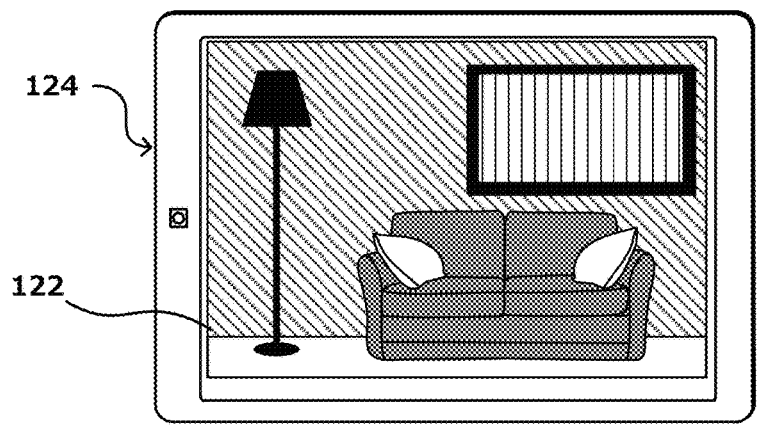
FIGS. 3A-3C illustrate an example approach for determining visually similar items, in accordance with various embodiments.
Figure 3B:
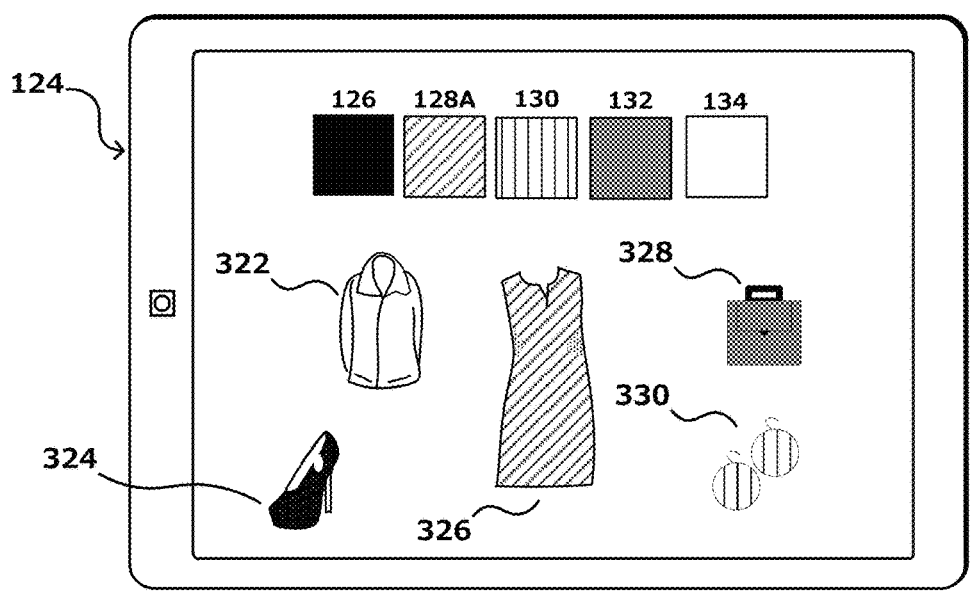

FIGS. 3A-3B illustrate an example approach for determining visually similar apparel items, in accordance with various embodiments. In the example 300 of FIG. 3A, the image 122 is presented to a user on the computing device, which is then processed according to the various techniques described herein to identify one or more apparel items (although, as discussed herein, the techniques described herein are not so limited). For example, the color palette may be matched to a single apparel item or type of item. In one example, a customer is identified as having purchased one type of apparel item (e.g., a dress), and if the customer requests an item that is visually similar to the image 122, then a dress whose color and/or pattern vector is as close to the feature vectors extracted from the image 122 as possible is identified and presented. In the example 320 of FIG. 3B, an outfit of apparel items 322-330 has been selected for presentation on the computing device 124. For example, based on the colors 126, 128A, 130, 132, 134 of the color palette 222, a jacket 322, shoes, 324, a dress 326, a purse 328, and earrings 330 have been selected as visually similar to the color palette 222. Each potential apparel item may have a corresponding number of categories or other data associated with them, such as whether an apparel item is an "accessory" or a main clothing item. Various apparel items 322-330 may be selected as visually similar to various colors 126, 128A, 130, 132, 134 of the color palette 222 based on these categories; for example, main apparel items such as a jacket 322 and dress 326 may be selected for colors 134, 128A of the color palette 222 that appear most often, over a largest area, etc., and accessory items such as shoes, 324, purses 328, and earrings 330 may be selected for colors 126, 132, 134 of the color palette 222 that appear less often. In some embodiments, the number of pixels (or area, etc.) in the image 122 corresponding to each color of the color palette 222 may be used to select an apparel item of corresponding size; for example, the color having the fewest pixels in the image 122 may be correlated to the smallest apparel item of the potential apparel items that are selected to make up an "outfit." According to various embodiments, apparel items (and/or other items, depending on the embodiment) may be categorized as being of a color that is "neutral" or otherwise identified in a way that allows for the particular item and/or color to be selected as a "primary" item in the outfit.

Figure 3C:
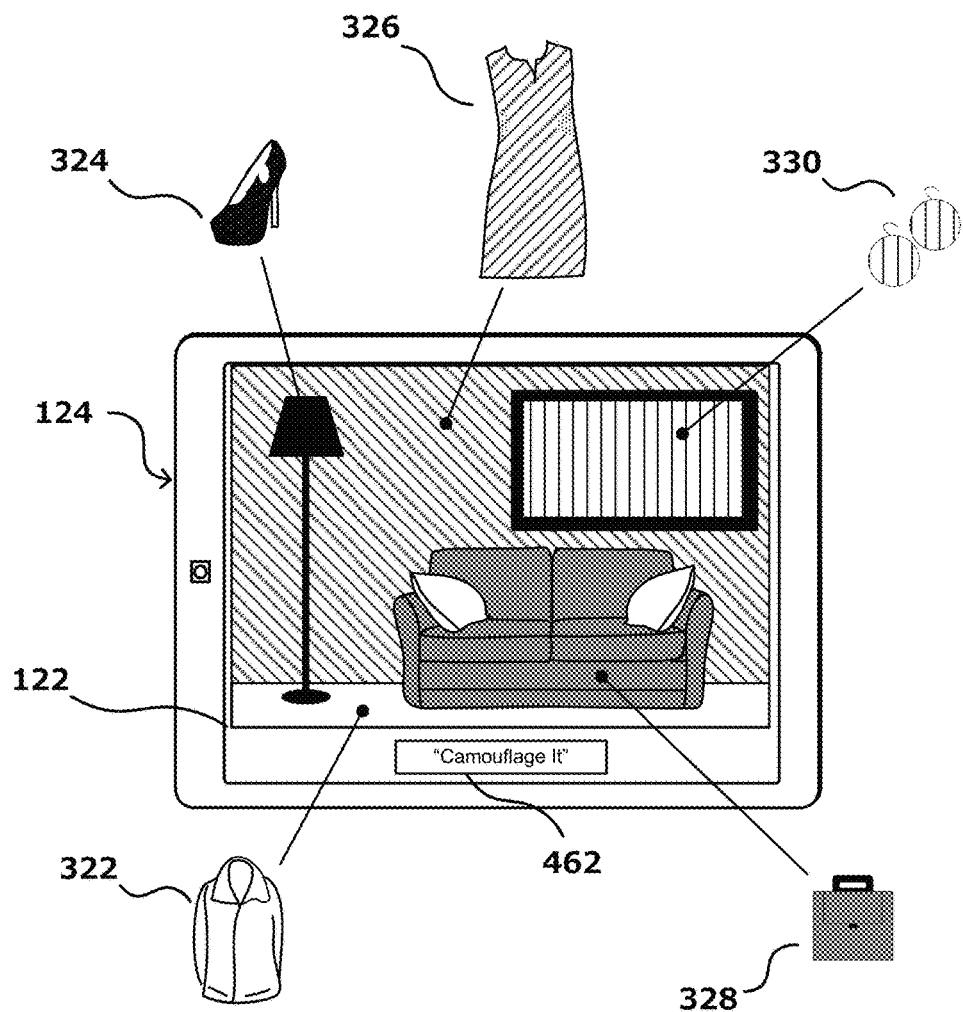

In the example 360 of FIG. 3C, an option to "camouflage" the selected items 322-330 may be presented to a user on the computing device 124, for example through a user interface element 462. Upon receiving an indication of a user selecting the element 462, the selected apparel items 322-330 may be overlaid into the original image 122 such that the apparel items 322-330 of a particular color are overlaid onto areas of the image 122 having a corresponding color. This may be considered as putting the apparel items 322-330 into "camouflage," such that they are attempted to be hidden in, or otherwise blended into the image 122. Some or all of the apparel items 322-330 may be displayed on the screen with the image 122, and upon receiving the command, may move into "camouflage," and upon the element 462 be toggled off, move back to their original location on (or off) the screen. In various embodiments, this "camouflage" embodiment may further include superimposing the apparel items 322-330 onto a model and placing the model into the image 122 such that any off-color background is masked out of the model with the apparel items 322-330 so that it may appear as if the model wearing some or all of the apparel items 322-330 blends into the image 122. The apparel items 322-330 may be associated with {x,y} coordinates or other data in order for the "camouflage" operation to be performed; for example, to indicate a vertical orientation of the apparel items and/or indicate where to place the apparel items 322-330 in the image 122 in order to "match" the colors. This embodiment may be utilized with more than just apparel items; for example, a white-colored toy may be "camouflaged" into an image containing a white-painted baseboard, for example.

Figure 4:
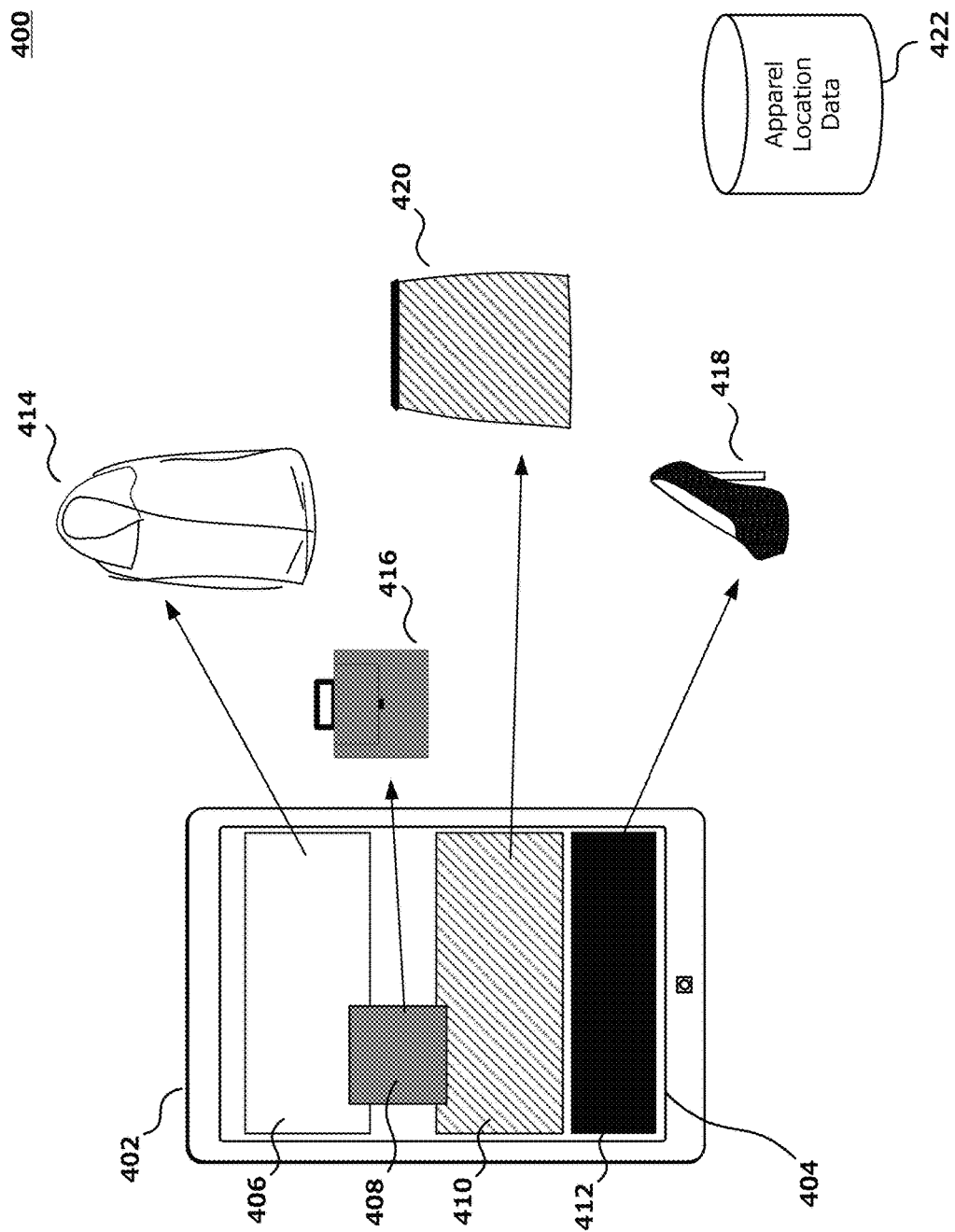
FIG. 4 illustrates an example approach to correlating visually similar items to regions of an image, in accordance with various embodiments.

While various embodiments recommend apparel items that best match the color and/or texture "story" of the image 122, other embodiments use various rule-based approaches to identify visually similar apparel items. In the example 400 of FIG. 4, which illustrates an example approach to correlating visually similar items to regions of an image 422 (such as may be displayed on a computing device 402), in accordance with various embodiments, apparel location data 422 or similar data may be used to identify which apparel items 414-418 may be presented as the visually similar items in the "outfit." In an example approach, the apparel location data 422 indicates whether a particular apparel item 414-420 is worn on the top, bottom, or middle of a person. Apparel items for different sections or locations of the body can be matched to patches extracted from corresponding sections of the image 404. When the patches (in various colors and/or textures, etc.) are extracted from the image 404, depending on whether the patch is extracted from the top, middle, or bottom of the image, a corresponding apparel item can be used in the visually similar outfit. As in the example 400 of FIG. 4, one patch is extracted from a region 406 at the top of the image 404, another patch is extracted from a region 410 in the middle of the image 404, another patch is extracted from a region 412 at the bottom of the image 404, and another patch is extracted from a region 408 that is smaller than the other regions and positioned between the top region 406 and the middle region 410. In the example of FIG. 4, it should be understood that the regions 406-412 are not necessarily rectangular areas; rather these rectangular portions of the illustration are demonstrative of regions of a more complex image that may be made up of numerous regions, such as of areas matching the color palette. For example, an image of a beach may have a region for white sand, a region for blue ocean and/or sky, a region for a green umbrella, etc., all of which may be represented by a region more complex than a rectangle. Therefore, the example regions 406-412 of FIG. 4 may be understood as easily understood examples rather than as limiting representations. These patches, based on their corresponding regions 406-412, may be matched to apparel items 414-420 that correspond to the locations of the corresponding regions 406-412. For example, the color of the top region 406 is visually similar to the selected jacket 414, which is worn on the top part of the body. The color of the middle region 410 is visually similar to the selected skirt 420, which is worn on the middle part of the body. The color of the bottom region 412 is visually similar to the selected shoes 418, which is worn on the bottom part of the body. The color of the smaller region 408 is visually similar to the selected purse 416, which is worn on the between the jacket and skirt and is smaller than both (e.g., as an accessory). In an embodiment, if two or more colors are extracted from the top of the image, then a main apparel item (e.g., a shirt, sweater, jacket, etc.) in the color that occurs more often may be selected and an accent/accessory item (e.g., a hat, sunglasses, purse, etc.) in the color that occurs less often may be selected.

According to an embodiment, once the regions 406-412 are identified, they may be presented to a user, such as with various types of UI elements allowing a user to resize or re-order them. For example, a user may be able to re-order region 408 above region 406, which in an embodiment would result in an appropriate apparel item being selected that is "above" a jacket in terms of outfit verticality; e.g., a gray hat. Another example embodiment may allow a user, such as a designer who has color swatches, to lay the swatches out and take a picture of them. Once the image is analyzed as described herein, the various regions corresponding to the color (or pattern, texture, etc.) swatches may be re-ordered or otherwise manipulated as described above so that various corresponding visually similar apparel items may be automatically selected. In the embodiment of home décor rather than apparel, swatches may be used to select various colors for structures, furniture, paintings, etc.

Figure 5:
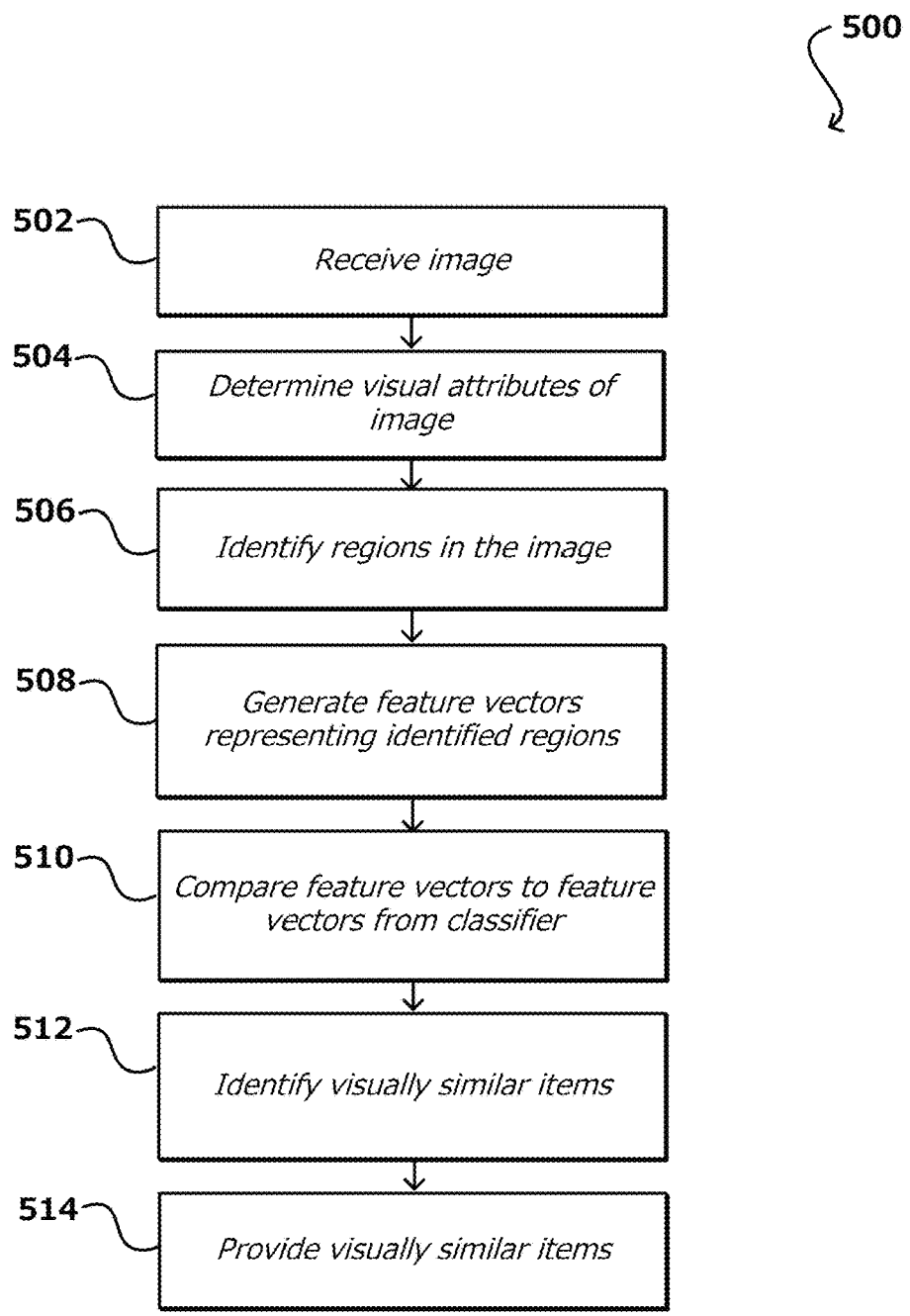
FIG. 5 illustrates an example process for identifying visually similar items, in accordance with various embodiments.

FIG. 5 illustrates an example process 500 for identifying visually similar items, in accordance with various embodiments. Although this and other figures may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways. In the example 500 of FIG. 5, an image is received 502, such as from an image capture element of a computing device, or an image stored on a computing device and transmitted for processing. One or more visual attributes/ properties/characteristics (e.g, color, texture, surface pattern, material, lighting field, spectral properties, reflectance properties such as a polished metal versus unpolished, etc.) of the image are determined 504, for example by selecting a number of colors, etc. that occur most frequently in the image. Histogram data may be used as part of the process, as described herein. Regions in the image are identified 506 from which patches are to be extracted, and the patches are fed into a classifier in order to generate feature vectors (e.g., color, texture, pattern, etc.) representing the identified regions 508. The extracted feature vectors are compared 510, for example to pre-processed, stored feature vectors of a corpus of items for visually similar matching purposes. A subset of the items are identified as visually similar 512 to one or more of the extracted feature vectors from the image, and the items (or a subsequent subset of the subset) are provided 514, for example to be displayed on a display screen of a computing device.

Figure 6:
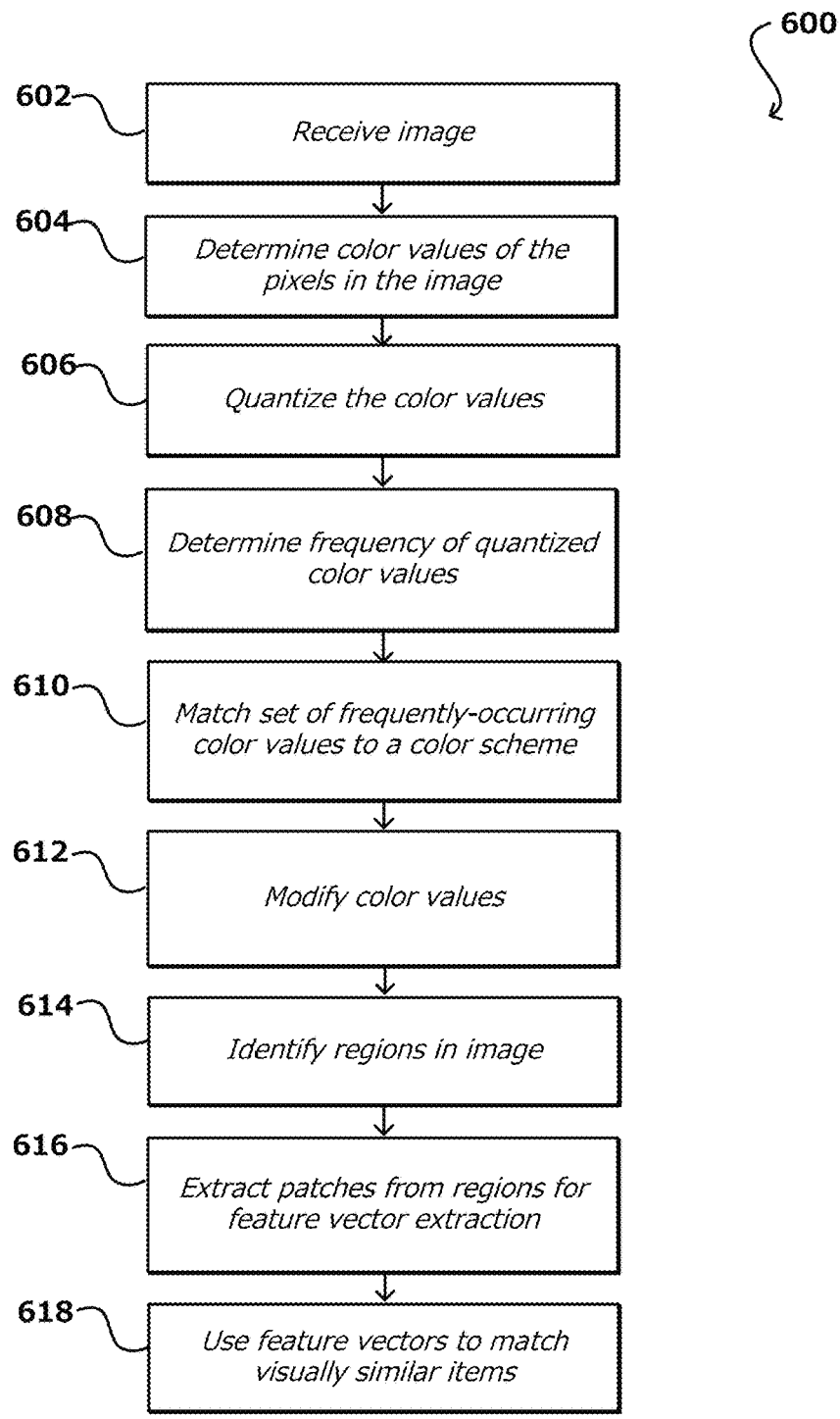
FIG. 6 illustrates an example process for identifying visually similar items, in accordance with various embodiments.

FIG. 6 illustrates an example process 600 for identifying visually similar items, in accordance with various embodiments. An image is received 602, and the color values for pixels in the image are determined 604. As discussed herein, visual attributes including and/or in addition to color may be utilized. The colors in the image may be quantized 606; i.e., reduced to a subset that is more manageable to handle, and a frequency of the quantized color values is determined 608, such as by using a histogram to plot data identifying the color values belonging to the most pixels. A subset of the frequently-occurring color values is matched 610 to a color scheme, for example based on a database of rules representing the various available color schemes. One or more of the color values from the image may be modified 612 in order to create a better match to the selected color scheme. Regions of the image are identified 614 from which patches may be extracted 616 for subsequent feature vector extraction or other processing, such as by a classifier, resulting in the generation of one or more feature vectors, which are then used to match visually similar items 618, such as apparel items in an electronic catalog of apparel items.

As described herein, a person may desire to purchase one or more items that have some degree of visual similarity to an image (e.g., a photo, video, live video, etc.). In accordance with various embodiments, determining visually similar items based on color and/or other features to provide recommendations for display can be determined using feature vectors and/or a classifier, etc. trained to identify a color (or other feature) represented in an image to generate a feature descriptor that can be used to compare against a data store of feature descriptor to locate an appropriate item. The classifier can be trained using a convolutional neural network (CNN).

Convolutional neural networks are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling. There is an input layer which along with a set of adjacent layers forms the convolution portion of the network. The bottom layer of the convolution layer along with a lower layer and an output layer make up the fully connected portion of the network. From the input layer, a number of output values can be determined from the output layer, which can include several items determined to be related to an input item, among other such options. A CNN is trained on a similar data set (which can include apparel items such as dresses, pants, watches, earrings, necklaces, belts, sunglasses, etc., as well as furniture, artwork, etc.), so it learns the best feature representation of a color or other characteristics represented for this type of image. The trained CNN is used as a feature extractor: an input image is passed through the network and intermediate outputs of layers can be used as a feature descriptor of the input image. Similarity scores can be calculated based on the distance (e.g., Euclidean distance) between the one or more feature descriptors/vectors and the one or more candidate content feature descriptors/vectors, and used for building relation graphs, determining visually similar items, etc.

A content provider can thus analyze a set of images and determine items that may be able to be associated in some way, such as clothing and apparel that may be worn together based on, for example, color represented in the image to find an accessory in a matching color to an apparel item. Similarity, as discussed herein, a content provider can analyze an input image and determine visually similar items that have had feature vectors previously determined and stored based on the classifier mechanisms. New images can be received and analyzed over time, with images having a decay factor or other mechanism applied to reduce weighting over time, such that newer trends and fashions can be represented by relations in the classifier. A classifier can then be generated using these relationships, whereby for any item of interest the classifier can be consulted to determine items that are related to that item in some way, such as clothing and apparel that may be worn together based on, for example, color being worn or used together by one or more users, complementary colors based on various color schemes, etc. Further, in accordance with various embodiments, the content provider can use the CNN to analyze a set of images, and determine all items that are worn together by a person in the image or, for example, between images. A relation table and/or graph can then be generated using these relationships, whereby for any item of interest the table or graph can be consulted to determine items that are related to that item in some way, such as being worn or used together by one or more users. For example, the table and/or graph can be used to identify which categories of accessories are most commonly worn and/or purchased along with apparel items from various categories. That is, when a user purchases a pair of pants, they might be looking for matching belts. Such relationships can further distinguish fine categories of accessories. For example, if a user purchases an expensive apparel item, fine or otherwise luxury accessories can be recommended rather than fashion accessories.

In any situation, the relationships can be weighted, scored, or have another appropriate value as discussed, which can be representative of the number of times those items appeared together, the type of person (i.e., celebrity or athlete) wearing those items, multiple color and/or patterns represented in the image, etc. The weightings can also be affected by whether they are items of the same type or style, or whether they are merely complementary items. These weightings or scores can be provided to a ranking algorithm that can also utilize other factors, such as item relatedness, common purchases or views by other users, or other such information, to generate relatedness scores for the items. The related items can then be ranked by score, for example, with content for a number of the highest ranked items being provided as recommendations along with the primary content for the item of interest. This information also can be used to select advertising that may be relevant for display with the primary content, as well as other types of related, complementary, or supplemental content.

In order to determine the items that are relevant (e.g., visually similar) to the item of interest (e.g., an input image), it can be desirable in at least some embodiments to generate a robust color or other feature representation that can exclude background colors and skin-tones. For example, as described, a robust color representation is desirable in at least some embodiments, to identify relevant colors of apparel items represented in images. Such a process can include, for example, identifying and discarding a background of the images and excluding skin tone of a person wearing the apparel item. Such an approach might include identifying the portions of the image that correspond to a single person, as well as those that correspond to various items. This can involve any of a number of segmentation processes, which can be performed manually or automatically in various embodiments. Thereafter, a CNN can be used to learn a color descriptor used to identify relevant content as described further herein. For example, the segmentation processes described herein may be utilized on apparel items in an electronic catalog of items, such that an appropriate feature vectors may be extracted so that feature vectors from an obtained image may be compared to the extracted feature vectors in an attempt to identify visually similar items. Further, a user may desire to have various portions of a query image run through a feature extraction process as described herein, or various items may be automatically identified as being related.

In a manual process, a person can cut, crop, or otherwise specify portions of an image that correspond to different items, such as apparel items, jewelry, and the like. The person can then manually attempt to identify the items, or can cause the designated portions to be analyzed by an object recognition algorithm, for example, where the person may first specify a category or type of item to minimize the search space, or the object recognition algorithm can do a full search against an entire search space, such as an electronic catalog.

In other embodiments, an automatic segmentation process can be used to analyze the various images and attempt to segment the image into portions corresponding to a single person or entity, individual objects or items in the image, or other such segments. One example approach to segmenting an image is illustrated in FIGS. 7A-7D, which illustrate example approaches for removing background from an image, in accordance with various embodiments. A first step of such an approach can involve removing background portions of the image or otherwise removing from consideration any portions of the image that do not correspond to an item of interest, in order to improve the accuracy of the results and lessen the amount of data to be analyzed. In the situation 700 of FIG. 7A, an image 700 is obtained that includes an item 702 that is contained in an electronic catalog, in this case the item being a dress being worn by a person and the dress is associated with a color. It should be understood that in some images a person might not be present, or only a portion of a person might be represented, among other such options. In the example situation 710 of FIG. 2B, a cropping process begins by starting at the corners and/or edges of the image and moving each side of a rectangle 712 inward until an edge or portion of a contour of an object is detected. It should be understood that a rectangle is used here for speed and simplicity because the image of interest is rectangular, but that other shapes can be used as well, such as squares, circles, and irregular shapes or contours. In some instances the background color will be known such that the process can move inward until a region with a color other than the background is determined. In other embodiments, the background color may need to be determined or background objects in the image removed using any appropriate process known or used for such purposes in other image-related processes.

After each edge has stopped at an edge or contour of an object, a rectangularly-bound region 722 of the image will be determined that will include the item of interest, as illustrated in the example situation 720 of FIG. 2C. For images that contain models wearing various items, this can help reduce the search space to the items worn by a single person. The image in some embodiments can then be cropped to this region, such that the background pixels previously located outside this region in the image are removed from the image file.

In at least some embodiments, a different approach can be taken to attempt to determine the region corresponding to the object versus the background region. For example, an attempt can be made to locate and/or grow connected regions of background color (or ranges of background color) from the corners or sides of the image towards the center of the image, to the extent possible. A connected component analysis, for example, can be utilized to attempt to connect the entire background region of the image, with the remaining region(s) being considered potential objects(s) of interest. In example situation 730 of FIG. 7D, an outline or mask region 732 can be determined that then corresponds to the foreground (or background) portion of the image. This can be used to crop the image based on the location of the object, or can be used to expand the object to the appropriate aspect ratio, as discussed elsewhere herein.

Figures 7A, 7B:
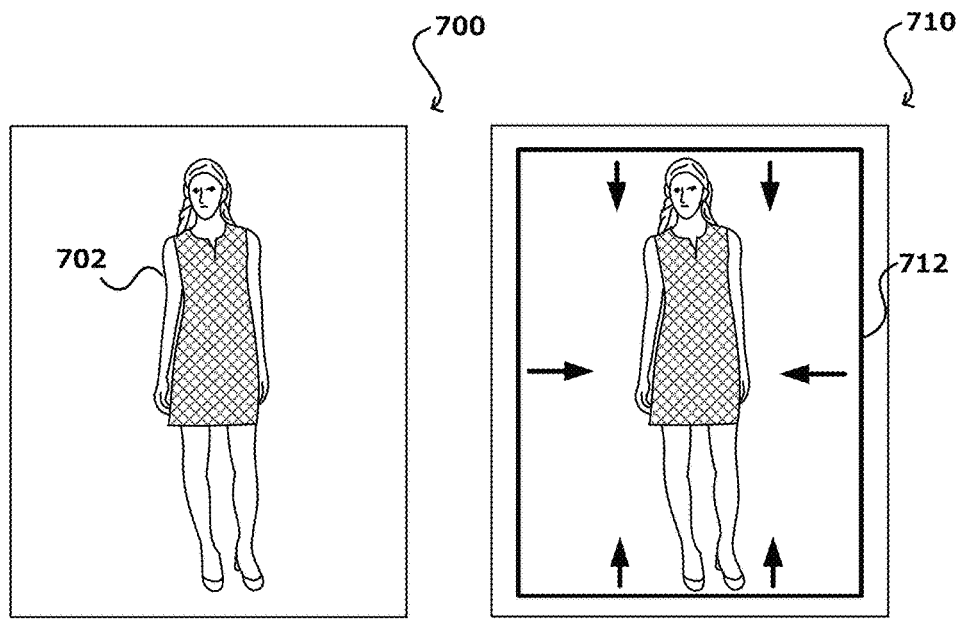
FIGS. 7A-7D illustrate example approaches for removing background from an image, in accordance with various embodiments.
Figures 7C, 7D:
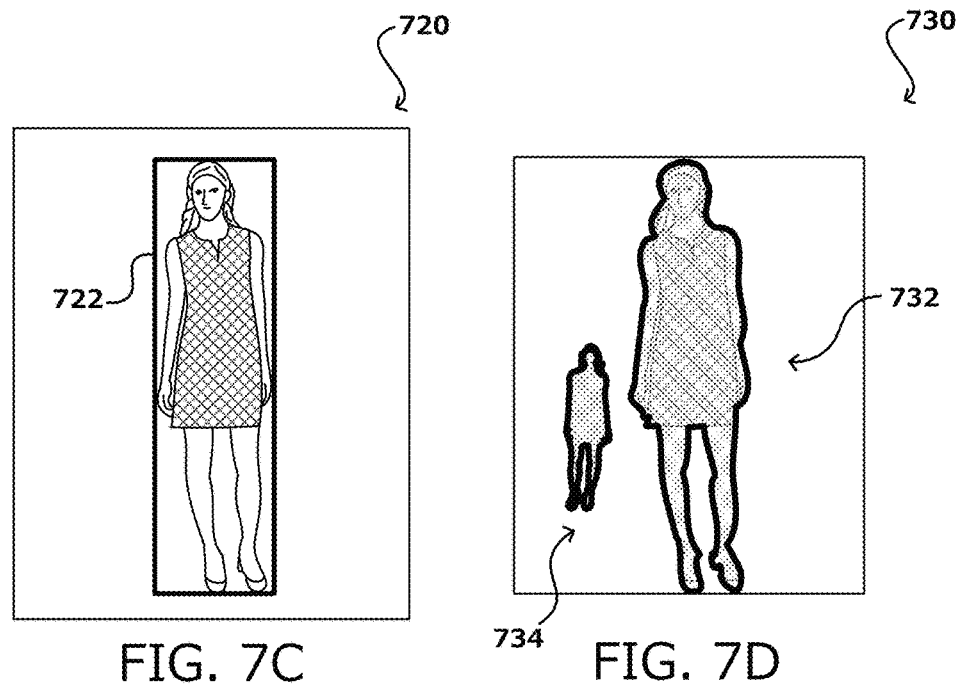

If the image includes multiple objects, such as a second person as illustrated in the example of FIG. 7D, the connected components analysis can still connect the background regions, which can result in determining a second object region 734 in the image. Various approaches can then either consider these objects together or as separate objects for purposes of cropping or image match. For images with multiple such object regions, one or more rules or policies could be utilized that indicate to select only the top region, most central region, largest region, etc.

Figure 8A:
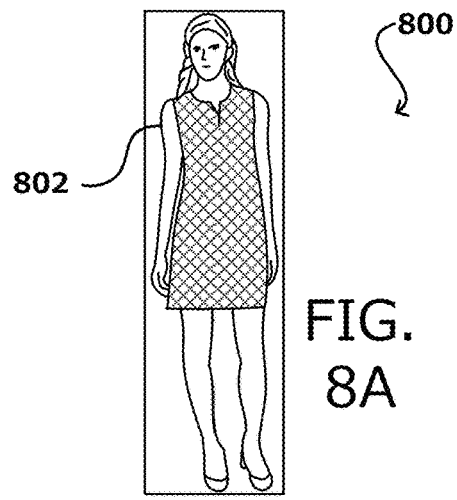
FIGS. 8A-8C illustrate an example approach to locating specific items represented in an image, in accordance with various embodiments.
Figure 8B:
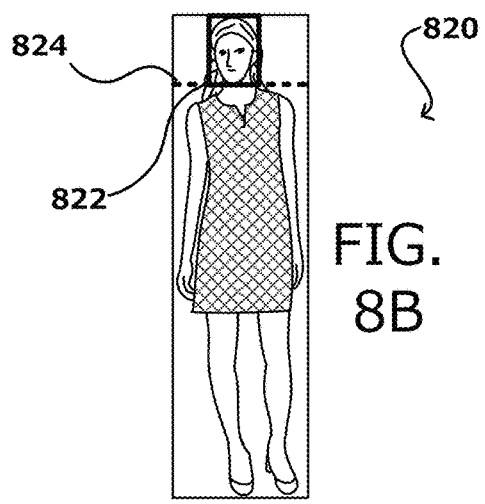
Figure 8C:
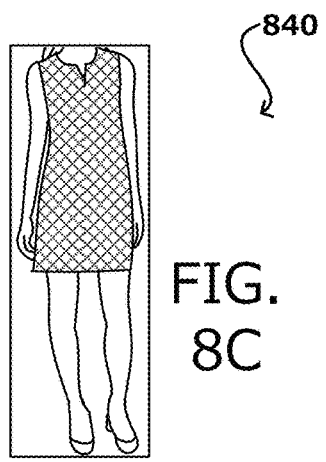

In at least some embodiments, a next portion of the process involves cropping the image based at least in part upon a location of a face of the wearer in the image. FIGS. 8A-8C illustrate an example approach to locating specific items represented in an image, in accordance with various embodiments. As illustrated in the example situation 800 of FIG. 8A, the input 802 can be the cropped image from FIG. 7D that has minimal background, although other versions of the image can be utilized as well within the scope of the various embodiments. From such an image, a face or head recognition process (i.e., a process using a Viola-Jones or deformable parts model (DPM)-based face recognition algorithm) can be used to attempt to locate a face or head in the image, at least in the upper portion (e.g., top half or quarter) of the image. As illustrated in the example situation 820 of FIG. 8B, a location or bounded region 822 identifying the location of such a face can be determined using an appropriate location algorithm as discussed elsewhere herein. From this region, an appropriate location for cropping can be determined. The appropriate location can depend at least in part upon the type of items to be recognized. For example, if the items include earrings and glasses then the location might be the top third of the person's head. If the items are only clothing, then the appropriate crop location might be at the bottom of the person's face, or just above the bottom in order to account for collars or other such features. If hats are to be considered then no cropping may be performed, but the location of the face may be used to segment out a potential hat portion of the image from the other portion of the image.

In this example, the location is the bottom of the head or face region in the up/down direction (in the figure). Such a point can be used to determine the new edge location 824 of the image, which passes through that point and parallel to the upper edge of the image (in the figure). It should be understood that terms such as "up" and "down" are used for purposes of explanation and that other arrangements or directions can be used as well within the scope of the various embodiments as appropriate. Using this edge location, the image can be cropped (or image data ignored) to remove the portion above that location, as illustrated in the example situation 840 of FIG. 8C. It should be understood, however, that processes other than traditional "cropping" can be used as well within the scope of the various embodiments. For example, pixels in the "cropped" or "cropped out" regions might have their values stored as metadata in the image, or set to an invisible or transparent setting, among other such options, such that the object appears to be cropped but the information is still in the image such that the original image can be recreated from the manipulated or "cropped" image if desired. In this example, the cropped image can be used as input to the next portion of the process.

Figure 9A:
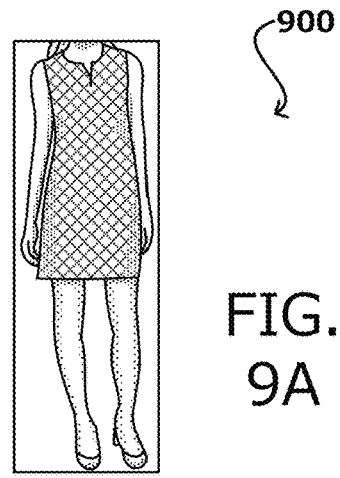
FIGS. 9A-9C illustrate an example approach to locating specific items represented in an image, in accordance with various embodiments.
Figure 9B:
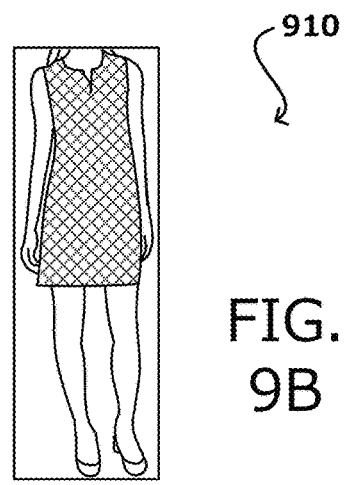
Figure 9C:
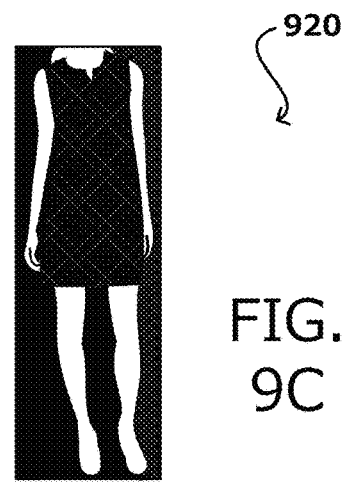

FIGS. 9A-9C illustrate an example approach to locating specific items represented in an image, in accordance with various embodiments. In the example situation 900 of FIG. 9A, it can be seen that the cropped image is provided that will likely be a full color (e.g., 24 bit) image, or other such image with a conventional color depth. In order to locate the leg regions without utilizing a complex image recognition process, approaches in accordance with various embodiments can attempt to locate regions of skin color or skin tone that are positioned in a way that would be expected for legs in the image. The skin colors can have ranges of values that can depend at least in part upon the color space, color depth, etc. In order to improve accuracy, in at least some embodiments a version of the cropped image is produced, as illustrated in the example situation 910 of FIG. 9B, which is quantized, or has a reduced color depth. Reducing the color depth to, say, 256 bit color, can cause the skin regions to have less color variation and thus be more likely detected as contiguous regions of skin color. From the quantized image, the color of each pixel in the image can be analyzed to determine whether each pixel is, or is not, colored with a color that is within the range of skin tones. For pixels in that range, those pixels can be assigned a first value, such as 0. For pixels with colors outside the skin color range, those pixels can be assigned a second value, such as 1. The result will then be a mask image, such as is illustrated in the example situation 920 of FIG. 9C, wherein the regions of skin are identified with respect to the non-skin regions. For example, the leg and arm regions of the image are readily identifiable from the skin mask image.

Once a skin mask (or similar binary version) is created, that image can be analyzed to attempt to determine the presence of legs in the image, as well of the positions of any such legs. FIGS. 10A-10F illustrate an example approach to locating specific items represented in an image, in accordance with various embodiments. For example, in the situation 1000 of FIG. 10A a scan (represented by the scan line 1002) can start at, or slightly above, the half-way point of the image from top to bottom. This is a reasonable place to start as legs will typically be located in the bottom half of the image, and starting here helps to reduce false positives that might otherwise be detected in the top half of the image. From this point, the scan line can move line by line (or every other line, etc.) towards the bottom of the image and attempt to locate scan lines where transitions between skin and non-skin regions indicate the potential presence of legs. For example, in the situation 1010 of FIG. 10B two scan line regions are illustrated where there are regions of skin and non-skin on the scan line. Any scan line that includes one or two areas of skin may be designated as a potential leg position, as the legs could be apart or could be together, where they might appear as a single skin region. A first pair of skin regions is designated by two segments 1012, 1014 that appear on the same scan line and are separated by a non-skin region. Similarly, a second pair of skin regions is also designated by two segments 1016, 1018 that appear on the same scan line and are separated by a non-skin region. Based on the scanning of the mask alone, it would be difficult to say with certainty which of these scan line segments correspond to legs and which correspond to arms.

Figure 10A:
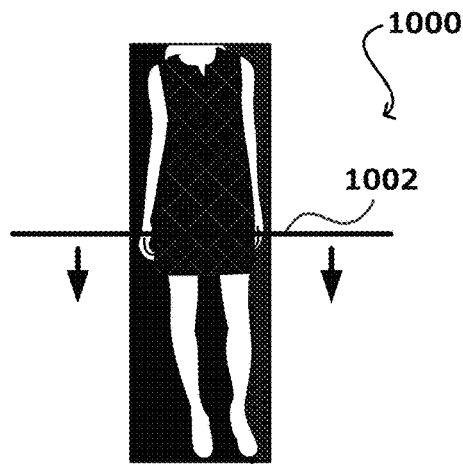
FIGS. 10A-10F illustrate an example approach to locating specific items represented in an image, in accordance with various embodiments.
Figure 10B:
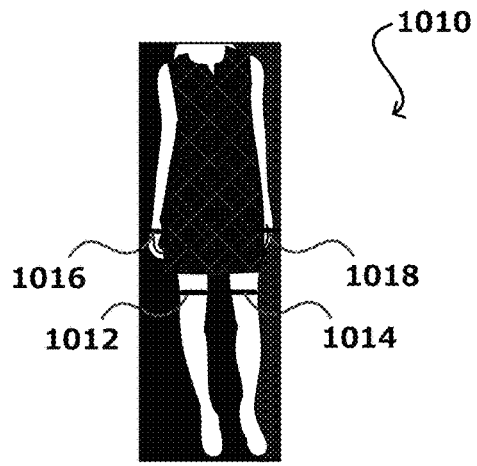
Figure 10C:
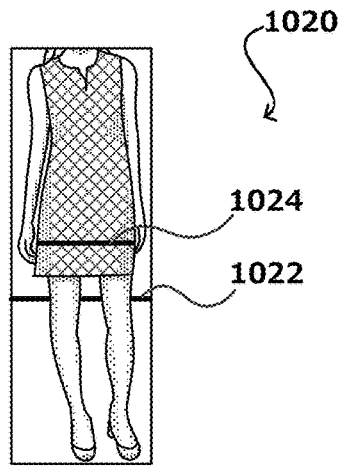
Figure 10D:
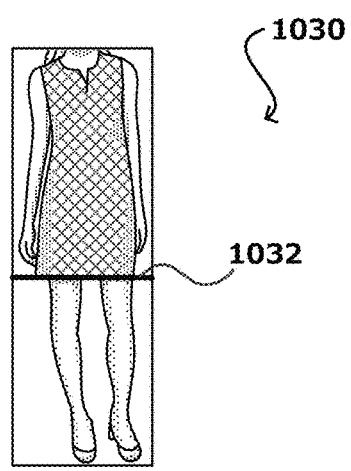

Accordingly, the process also utilizes a version of the image as illustrated in the situation 1020 of FIG. 10C, which can be a full color, reduced color, or grayscale image, among other such options. In this example, the image is a grayscale image and areas of background can be distinguished from areas of non-background color. In this case, a set of scan line segments 1022 corresponding to the first pair of segments 1012, 1014 in FIG. 10B shows that only background is located between the skin regions. Such a determination can be made by computing some edge features from a scan line or row of pixels, then processing these features using a classifier algorithm (e.g., hand-trained classifier, trained decision tree, etc.) to determine whether the row contains a dress and hands, a part of clothing, a pair of legs, etc. Based on at least this information, it can be determined from the example that the segments likely correspond to legs. A second scan line segment 1024 corresponding to the second pair of scan line segments 1016, 1018 indicates that, based on the color value of the pixels along the scan line between the skin region, the area between the skin regions is not background, which indicates that these regions are likely not leg regions, as a dress that stops at the knees, for example, would not have anything (typically) between the legs of the wearer below the knee. Further, the skin regions may be determined to be too thin, too far apart, or otherwise have aspects or dimensions that are indicative of not corresponding to legs in the image. By performing such a process down some, most, or all of the lower half of the image, for example, it can be determined that the visible portion of the legs starts at a particular scan line 1032 as illustrated in the situation 1030 of FIG. 10D. This may not be a precise determination due to the shape and deformability of the dress or skirt, but such precision may not be necessary for at least some embodiments. Once located, the image can be cropped to yield an image as illustrated in the situation 1040 of FIG. 10E. If a connected components-based approach was used as discussed elsewhere herein, the determination of background pixels between the leg regions can improve the confidence of the determination.

Figure 10E:
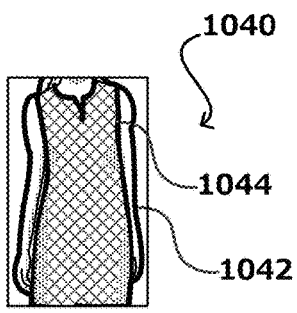
Figure 10F:
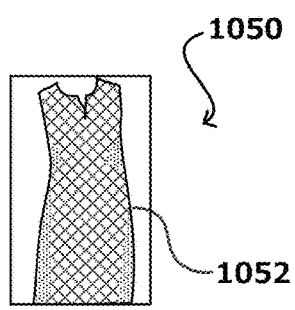

The image in the situation 1040 of FIG. 10E is cropped top to bottom to approximately the location of an item of interest. From earlier steps, the contour 1042 from the connected components analysis and a contour 1044 from the skin tone region analysis can be used to further remove portions of the image from consideration. For example, any remaining points in the image outside the connected components contour 1042 can be excluded from further analysis. Similarly, any points that were determined to correspond to regions of skin tone, inside a skin region contour 1044, for example, can also be excluded, although as mentioned in some embodiments such an approach may not be used for image regions with a very high percentage of skin tone pixel values, or low deviation from skin tone, as that might correspond to a dress or other item having a color within the skin spectrum. If the skin tone and connected components contour are used to exclude points from consideration, the remaining image illustrated in the situation 1050 of FIG. 10F will include pixel values almost exclusively that correspond to a region 1052 of the item of interest. This can help to automatically generate an image of the item to be used with suggestions, for example, but also can enable a sub-portion of the input image to be used for object identification or image/similarity matching, and may result in more accurate results than matching against the entire image. While such an approach may not be as accurate as running the image through a very complex image analysis routine, the process will be much faster and require far fewer resources. If the image of FIG. 10F is run through an image match process and several possibilities show up with all with relatively low confidence scores, the image can be further analyzed to attempt to determine whether the region includes multiple items, such as a top and a skirt instead of a dress, such that the image portions for those items can be searched separately. This can be done, for example, by looking for different colors or patterns, doing an edge analysis, performing another connected components analysis, or performing another image segmentation process as discussed or suggested herein.

A segmentation process can thus be used to identify portions of an image that correspond to a color or pattern of a particular item, so feature information of the color or pattern of the item can be used to determine a matching item in an electronic catalog or other data repository, for example against a query image, or to find other items that may be related (according to feature vectors, categories, etc.) to an item that is visually similar to a query image. For example, if the object found to be visually similar to a query image is a red dress, a search can be performed against data for visually similar accessories or other products, such as products with similar shapes, colors, patterns, textures, and other such aspects. By locating these similar objects the data for those objects can be aggregated and analyzed to determine a more accurate set of recommendations, or at least recommendations based on more data points.

In order to determine visually similar products such as an accessory item for an apparel item, or an item that is visually similar to a query image in at least some embodiments, some analysis of items in an electronic catalog or other data repository is performed in order to determine information about the visual characteristics of the items. In some embodiments, this involves the generation of one or more descriptors or vectors, such as color descriptors, that can be utilized for describing a color of a relevant apparel item in an image, while ignoring the background colors and skin-tones.

Figure 11:
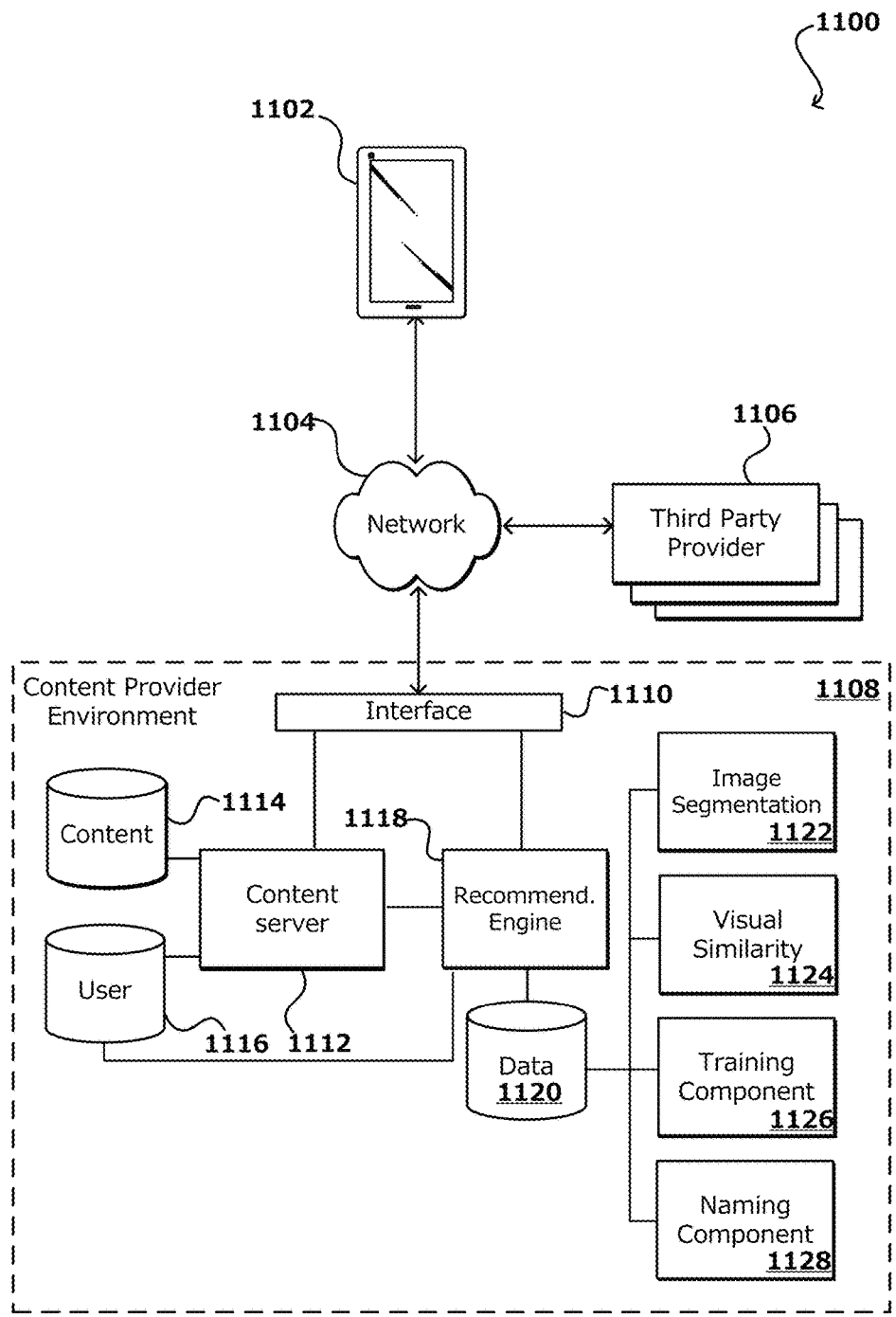
FIG. 11 illustrates an example environment for determining visually similar items, in accordance with various embodiments.

FIG. 11 illustrates an example environment for determining visually similar items, in accordance with various embodiments. In this environment, images can be analyzed from various sources to attempt to determine information that can be used to locate items that may be able to be associated in some way, such as apparel items that are visually similar (e.g., color, texture, pattern, etc.) to an image or portions of an image, clothing that may be worn together, items that may be arranged together as part of a display, etc.

In this example environment, in accordance with various embodiments, a convolutional neural network (CNN) can be trained using images of apparel items that include metadata that includes, for example, labeled color data corresponding to color(s) of the apparel item, a description of the apparel item, a title of the apparel item, a category of the apparel, etc. In certain embodiments, training a CNN may involve significant use of computation resources and time, such that this may correspond to a preparatory step to servicing search requests and/or performed relatively infrequently with respect to search request servicing and/or according to a schedule. An example process for training a CNN for generating descriptors (e.g. descriptor vectors, feature vectors, etc.) describing visual features of an image in a collection of images begins with building a set of training images. In accordance with various embodiments, each image in the set of training images can be associated with a color label describing a color of an item of interest represented in the image, although many other characteristics of an item of interest may be trained in this manner, such as texture, pattern, etc., so the approaches described herein should be limited solely to color, although the examples below may be described exclusively with reference to color for simplicity.

According to some embodiments, training images and respective training color labels can be located in a data store 1120 that includes images of a number of different items of interest, wherein each image can include metadata. The objects can include, for example, apparel items and accessory items. The metadata can include, for example, the title and description associated with the objects. The metadata can be used to generate color labels that can be used to label one or more primary colors represented in the image. For each image, image segmentation component 1122 can segment the images, as described, for example, with respect to FIGS. 2-5 such that object represented in the image can be analyzed. Metadata associated with each image (or at least a portion of those images) is segmented into n-grams (i.e., set of words), and the n-grams are associated with a respective image.

In the next step, a naming, labeling, or other such component 1128 can be utilized to select a set of color labels. Color labels can be words used to describe a color (e.g., a color value in a color space such as RGB, LAB, etc. For example, "teal" and "teal blue" are both color labels used to describe the color "teal." Determining color labels to label the collection of images includes, for example, obtaining a master list of colors and combining the colors listed in the master list of colors with color labels determined from the n-grams associated with each image into an initial color label set. A number of occurrences of each color label from the initial color label set can be determined. For each color label, a respective number of occurrences can be compared to a threshold. Color labels associated with a number of occurrences that a least meets the threshold are used to generate first draft list of color labels. Color labels may reference color values, and vice-versa.

The next step is to clean up the first draft list of color labels to generate a working list of color labels. This can include, for example, removing words from color labels that have other meanings. For example, in the situation where the color label indicates that the color is "Company name" green, the words used to create the company name can be removed. In another example, color labels that more commonly describe other features of apparel can be removed. For example, the word "tulip" is used to describe a skirt shape more often than a color in certain apparel categories. In yet another example, color labels that describe essentially the same color can be combined. For example, a color label specifying the color golden can be combined with a color label specifying the color gold. Still yet another approach, color labels that are used interchangeably can be combined. For example, the color labels hot pink and fuchsia can be combined into, for example, the color label fuchsia. It should be noted that one or more of these approaches can be utilized to generate a working list of color labels. Further, in accordance with various embodiments, in an initial build phase, the working list of color labels can be further developed and refined as additional images are added to the collection of images. For example, this and other processes described herein can be repeated to update the working list of color labels after, for example, a predetermined number of images are added to the collection, after a predetermined period of time, a combination thereof, etc.

Once the working list of color labels is generated, the images in the collection of images are labeled using the list. For example, metadata associated with each image in the collection of images is compared to the color labels in the working list of color labels to determine any matches. In the situation where more than one match is determined for a given image, the set of possible color labels is reduced by selecting color labels that include, for example, the most number of words to identify a more descriptive color label to associate with the item represented in the image. For example, a more descriptive color label with two words like "navy blue" is given preference over a label with one word like "blue." In the situation where the set of possible color labels for a given image includes only one color label, the item represented in the image is labeled using that color label. In certain embodiments, in the situation where the set of possible color labels includes more than one color label, the image is discarded for the purpose of training. For example, an image that includes the color labels "black" and "blue" will be discarded. The approach results in determining a training data set that includes a subset of the images from the collection of images and an associated color label for each image.

A training component 1126 can utilize the training data set (i.e., the images and associated color labels) to train a CNN. In accordance with various embodiments, a CNN can be used to determine color represented in an image by disregarding non-apparel elements like background and skin tone. In this way, the CNN can focus on, for example, the apparel color while learning to ignore any remaining background colors and the skin-tones in the image. The CNNs can also capture subtle variations between different shades of the same color. As further described, CNNs include several learning layers in their architecture. A query image from the training data set is analyzed using the CNN to extract a feature vector from the network before the classification layer. This feature vector describes the color of the relevant item represented in the image, while ignoring the background colors and skin-tones. This process can be implemented for each of the images in the data set, and the resulting color feature vectors can be stored in a data store.

In various embodiments, the resulting color feature vectors can be compressed for improved processing. For example, the color feature vectors generated by the CNN may include color feature vectors that have a large number of dimensions. The dimensions of these color feature vectors can be reduced by applying at least one of Principal Component Analysis (PCA) or Multi-Dimensional Scaling (MDS). Advantageously, such an approach can reduce storage demands and significantly improve latency performance. Additionally, such an approach can remove or at least reduce noise in the transformed space since the tailing dimensions generally correspond to noise and discarding them helps to focus on the useful signal when measuring similarities.

When a query is received, for example, a set of query color descriptors may be obtained or determined for the query image or the regions, patches, etc. that may be extracted from the image. For example, if the query image is not part of an electronic catalog and does not already have associated color descriptors, the system may generate color descriptors for the query content in a same and/or similar manner that the color descriptors are generated for the collection of images, as described. Also, for example, if the query image is part of the collection then the color descriptors for the query image may be obtained from the appropriate data store. The data store of color feature vectors can be searched to identify a set of candidate accessory color descriptors. Similarity scores can be calculated based on the distance (e.g., Euclidean) between the one or more query color descriptors (e.g., the image obtained from a user) and the one or more candidate color descriptors (e.g., for apparel items in an electronic catalog that have been previously processed by a classifier). A visual similarity component 1124 or other such component can be used to search the collection of images to identify a set of images that are similar or at least complement the query image. Since color descriptors have been calculated or obtained for the query image, comparing images can be accomplished by comparing the color descriptors of query images to the color descriptors of the images of the collection. For example, distances may be determined between the local-texture, global-shape, and local-shape color descriptors of the query image and the local-texture, global-shape, and local-shape color descriptors of the images in the collection of images. According to some embodiments, dot product comparisons are performed between the color descriptors of the query image and the corresponding color descriptors of the images of the collection. The dot product comparisons are then normalized into similarity scores. Thus, between any two images, various similarity scores may be provided, such as: (1) a similarity score between the local-texture color descriptors of the images; (2) a similarity score between the global-shape color descriptors of the images; and (3) a similarity score between the local-shape color descriptors of the images. After similarity scores are calculated between the different types of color descriptors of the images, the similarity scores can be combined. For example, the similarly scores may be combined by a linear combination or by a tree-based comparison that learns the combinations. For example, using a linear combination may provide the advantage of enabling a user to assign different weights to the different types of color descriptors, thereby causing the search module to consider the weighting when selecting the nearest content colors. It should be appreciated that instead of a dot product comparison, any distance metric could be used to determine distance between the different types of color descriptors, such as determining the Euclidian distance between the color descriptors.

After the combined similarity scores are determined, a set of nearest color descriptors may be selected. For example, the search module may select a subset of content color descriptors associated with images of the collection that are nearest the query color descriptors as determined by the combined similarity scores. Images in the collection associated with the subset of nearest color descriptors may be provided for analysis and/or presentation. For example, the search module may determine images in the collection that match the set of nearest content color descriptors selected at step and provide at least reference to the matching images. As mentioned, in various embodiments the references can be used with a recommendations component 1118 to generate recommendations for a user based on information known or obtainable with respect to the items for the matching images (e.g., location, category, popularity, purchase sims, etc.).

In accordance with various embodiments, the recommendation component can be used to determine which categories of accessories that are most commonly purchased along with apparel from various categories. For example, when a user purchases a pair of pants, matching belts can be recommended to the user. In another example, when a user purchases a dress, complementary earrings or necklaces can be recommended to the user. In at least some embodiments, it might be desirable to distinguish fine categories of accessories. For example, if a user purchases an expensive cocktail dress fine earrings rather than fashion earrings might be recommended to the user.

In order to determine categories of accessories that are most commonly purchased along with apparel from various categories in at least some embodiments, some analysis of items in an electronic catalog or other data repository is performed in order to determine something about the visual characteristics of the items. In this example, input variables can include a set of categories of apparel items. One of more of these categories can be set for any training or query example. The outputs can be a set of categories of accessory items and should be categories most likely to be purchased along with the input apparel item. These category variables will have higher values than the other category variables in the labeled training data. In accordance with various embodiments, determining these categories can be based at least in part on user behavior. For example, user behavior with respect to various items provided through an electronic marketplace can be determined in order to calculate a probability that a user was searching for a particular type of item for a given search. The user behavior can include historical action data, such as information that indicates items that were selected in response to a particular search and/or items that were purchased in response to a particular search. The historical action data can be analyzed to generate an index that maps searches to one or more types of products, where each of these mappings is associated with a probability that indicates the likelihood that the search was intended for a particular type of product. Additionally, the historical data can be used to train any machine learning tool such as a decision trees/forests, SVMs, deep networks, etc. After the training phase, the trained system can be used to predict which category (or categories) of accessory items should be recommend for a particular item of apparel.

In a post processing aspect of the environment, a user is able to use a client device 1102 to submit a request for content, such as a webpage or page of an electronic book, across at least one network 1104. Although a portable computing device (e.g., an electronic book reader, smart phone, or tablet computer) is shown as the client device, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, wearable computers (i.e., smart watches and glasses) and portable media players, among others.

The at least one network 1104 can include any appropriate network, such as may include the Internet, an Intranet, a local area network (LAN), a cellular network, a Wi-Fi network, and the like. The request can be sent to an appropriate content provider environment 1108, which can provide one or more services, systems, or applications for processing such requests. The content provider can be any source of digital or electronic content, as may include a website provider, an online retailer, a video or audio content distributor, an e-book publisher, and the like.

In this example, the request is received to a network interface layer 1110 of the content provider environment 1108. The network interface layer can include any appropriate components known or used to receive requests from across a network, such as may include one or more application programming interfaces (APIs) or other such interfaces for receiving such requests. The network interface layer 1110 might be owned and operated by the provider, or leveraged by the provider as part of a shared resource or "cloud" offering. The network interface layer can receive and analyze the request from the client device 1102, and cause at least a portion of the information in the request to be directed to an appropriate system or service, such as a content server 1112 (e.g., a Web server or application server), among other such options. In the case of webpages, for example, at least one server 1112 might be used to generate code and send content for rendering the requested Web page. In cases where processing is to be performed, such as to generate search results, perform an operation on a user input, verify information for the request, etc., information might also be directed to at least other server for processing. The servers or other components of the environment might access one or more data stores, such as a user data store 1116 that contains information about the various users, and one or more content repositories 1114 storing content able to be served to those users.

As mentioned, in at least some embodiments the content to be provided can include data 1120 for one or more recommendations, advertisements, or other such elements that are selected based on information for the user associated with the request, for example by providing information to a recommendation engine 1118 or other such component or service, for analyzing the provided information and attempting to generate recommendations or other elements as discussed herein. In some embodiments, this can utilize content generated within the content provider environment 1108 or received from one or more third party providers 1106, among other such options. For example, a category of images can be generated using images captured within the environment or received from the third party providers 1106. As mentioned, an image segmentation system 1122 or other such component or service can analyze the images to attempt to determine portions of those images that correspond to individual items that have data stored in the content repository 1114 or elsewhere in the content provider environment 1108. This can include, for example, images of items available for consumption. The environment can also include a visual similarity system 1124, or other such component or service, for analyzing the image portions for the individual items and attempting to locate content for similar items that are at least somewhat visually similar. Again, this can include comparing the image portions, or data for those portions, against image data stored for items in the catalog. Based at least in part upon this information, the recommendation component, or other such system, service, or component, can attempt to items that may be able to be associated in some way, such as clothing that may be worn together, items that may be arranged together as part of a display, etc.

[The following is boilerplate-type language relating to devices, networks, and protocols that can be used to implement aspects of your invention. These sections have been reviewed in other applications and, as such, can be skimmed for applicability if desired.]

Figure 12:
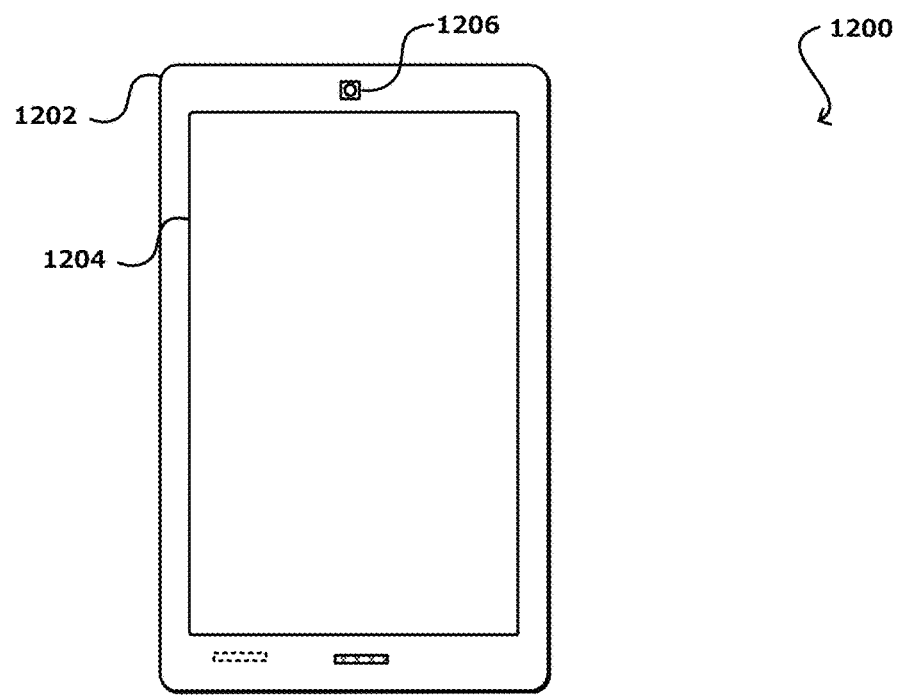
FIG. 12 illustrates an example device that can be used to implement aspects of the various embodiments.

FIG. 12 illustrates an example 1200 of an electronic user device 1202 (e.g., device 104 in FIG. 1A) that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 1202 has a display screen 1204 on the front side, which under normal operation will display information to a user facing the display screen (e.g., on the same side of the computing device as the display screen). The computing device in this example includes at least one camera 1206 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 1202 also includes at least one microphone 1208 or other audio capture device capable of capturing audio data, such as words or commands spoken by a user of the device. In this example, a microphone 1206 is placed on the same side of the device as the display screen 1204, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 1202 also includes at least one orientation sensor, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

The example computing device 1202 may include at least one touch-sensitive surface, for example coupled to the display screen 1204, or the display screen 1204 may be a touch-sensitive surface. The example computing device 1202 may also include at least one component for detecting touch to the at least one touch-sensitive surface, including at least duration and/or pressure of such touches, as well as at least one component for detecting gestures, for example made by touching the touch-sensitive surface with a finger and moving the finger in a pattern while maintaining contact with the touch-sensitive surface.

Figure 13:
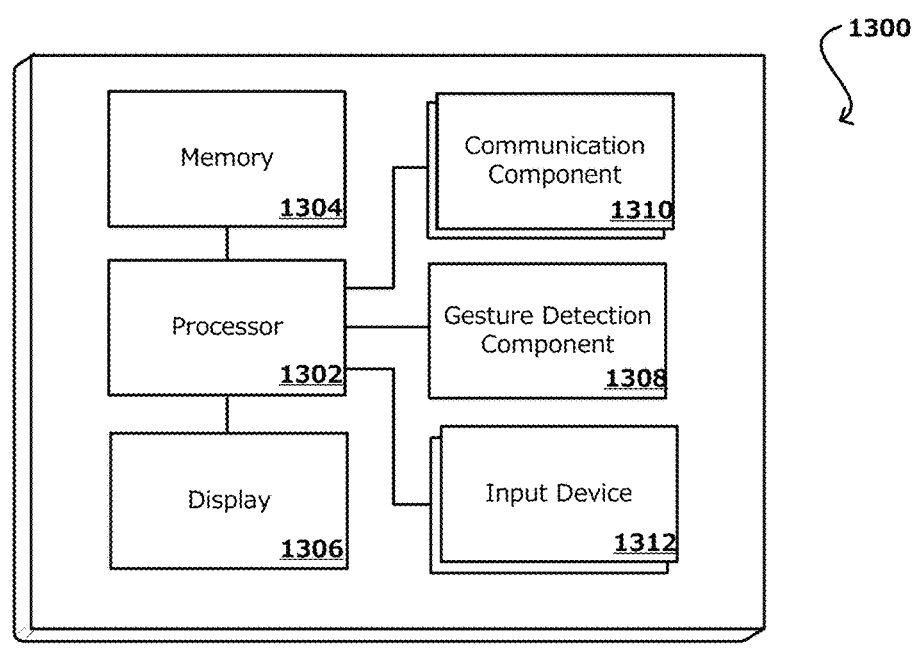
FIG. 13 illustrates an example set of basic components of a computing device, such as the device described with respect to FIG. 12.

FIG. 13 illustrates a logical arrangement of a set of general components of an example computing device 1300 such as the device 1202 described with respect to FIG. 12. In this example, the device includes a processor 1302 for executing instructions that can be stored in a memory device or element 1304. As would be apparent to one of ordinary skill in the art, the device can include many types of memory, data storage, or non-transitory computer-readable storage media, such as a first data storage for program instructions for execution by the processor 1302, a separate storage for images or data, a removable memory for sharing information with other devices, etc. The device typically will include some type of display element 1306, such as a touch screen or liquid crystal display (LCD), although devices such as portable media players might convey information via other means, such as through audio speakers. The device in many embodiments will include at least one gesture detection element 1308, which may include elements to detect touch on a touch-sensitive surface, as well as deciphering the use of touch patterns (e.g., tracing of a finger, number of touches, duration and/or pressure of touch, etc.) that can be determined by the processor and/or the at least one gesture detection element 1308. The device in many embodiments will include at least one image capture element (not pictured) such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component, such as a mono or stereo microphone or microphone array, operable to capture audio information from at least one primary direction. A microphone can be a uni- or omnidirectional microphone as known for such devices.

In some embodiments, the computing device 1300 of FIG. 13 can include one or more communication elements 1310, such as a Wi-Fi, Bluetooth, RF, wired, or wireless communication system. The device in many embodiments can communicate with a network, such as the Internet, and may be able to communicate with other such devices. In some embodiments the device can include at least one additional input component 1312 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 1300 also can include at least one orientation or motion sensor or component (not shown). As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 1302, whereby the device can perform any of a number of actions described or suggested herein.

Figure 14:
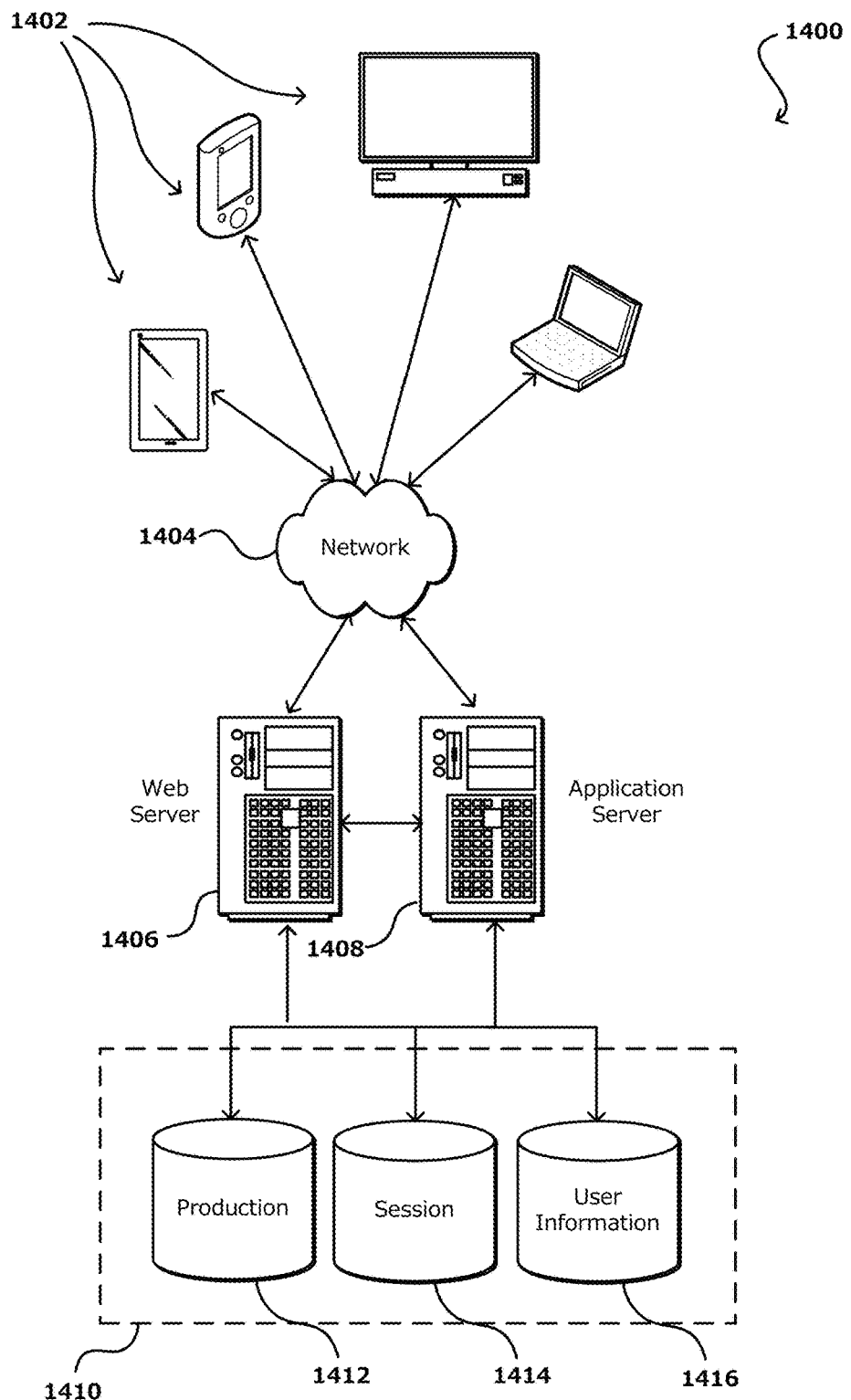
FIG. 14 illustrates an example environment in which various embodiments can be implemented.

As discussed, different approaches can be implemented in various environments in accordance with the described embodiments. For example, FIG. 14 illustrates an example of an environment 1400 for implementing aspects in accordance with various embodiments. As will be appreciated, although a Web-based environment is used for purposes of explanation, different environments may be used, as appropriate, to implement various embodiments. The system includes an electronic client device 1402, which can include any appropriate device operable to send and receive requests, messages or information over an appropriate network 1404 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1406 for receiving requests and serving content in response thereto, although for other networks an alternative device serving a similar purpose could be used, as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1402 and the application server 1408, can be handled by the Web server 1406. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing production data 1412 and user information 1416, which can be used to serve content for the production side. The data store also is shown to include a mechanism for storing log or session data 1414. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 1402. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including non-transitory computer-readable storage media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a computing device processor;
   a memory device including instructions that, when executed by the computing device processor, cause the computing device to:
   obtain an image;
   analyze the image to determine color values for a plurality of pixels comprising the image, wherein the color values correspond to a particular color space;
   generate a histogram of the color values that identifies a frequency of each color value represented in the image;
   determine a subset of the color values, each color value of the subset appearing in the image greater than a threshold amount;
   identify a plurality of regions of the image, each of the plurality of regions of the image including pixels having a color value of the subset of color values;
   generate a query feature vector for each of the plurality of regions of the image;
   compare the query feature vectors against an electronic catalog of stored feature vectors, the stored feature vectors corresponding to apparel items; and
   determine a set of apparel items that are visually similar to the image, each of the set of apparel items having a corresponding stored feature vector being within a threshold distance of one of the query feature vectors.

2. The computing device of claim 1, wherein the instructions, when executed further enable the computing device to:
   compare the subset of color values against a plurality of potential color schemes to identify at least one target color scheme; and
   modify at least one of the subset of color values based on the target color scheme.

3. The computing device of claim 1, wherein the instructions, when executed further enable the computing device to:
   determine, for each of the query feature vectors, a first vertical location of the respective region of the plurality of regions of the image from which the query feature vector was generated;
   determine, for each of the set of apparel items, a second vertical location corresponding to a portion of a body on which the apparel item is intended to be worn;
   identify a subset of the apparel items, each apparel item of the subset of apparel items having a second vertical location corresponding to the first vertical location associated with the respective query feature vector.

4. The computing device of claim 3, wherein the instructions, when executed further enable the computing device to:
   determine that a first query feature vector and a second query feature vector are associated with a similar vertical location, wherein the first query feature vector and second query feature vector are representative of a first color and a second color, respectively;
   determine that the region of the image from which the first query feature vector was generated contains a greater number of pixels having the first color than the region of the image from which the second query feature vector was generated has pixels having the second color;
   provide, of the subset of the apparel items, an apparel item from a first category having a stored feature vector corresponding to the first query feature vector; and
   provide, of the subset of the apparel items, an apparel item from a second category having a stored feature vector corresponding to the second query feature vector,
   wherein the first category and the second category are selected based on a number of pixels having the first color and the second color, respectively.

5. A computer-implemented method, comprising:
   obtaining an image;
   determining a frequency at which a first plurality of visual attributes appear in the image, each of the first plurality of visual attributes represented by an attribute value;
   identifying a visual attribute scheme based on a comparison of the frequency of each visual attribute of the first plurality of visual attributes appearing in the image to a plurality of potential visual attribute schemes;
   determining a second plurality of visual attributes based on the visual attribute scheme;
   determining candidate regions of the image, each candidate region containing at least one of the second plurality of visual attributes;
   selecting one or more regions of the image from the candidate regions;
   determining one or more query feature vectors from each of the one or more regions;
   comparing the one or more query feature vectors against an electronic catalog of items having stored feature vectors; and
   identifying visually similar items in the electronic catalog, wherein the visually similar items are associated with stored feature vectors that correspond to one of the query feature vectors.

6. The computer-implemented method of claim 5, further comprising:
   using a trained neural network to identify the one or more query feature vectors, the trained neural network having been used to generate the stored feature vectors, wherein the visually similar items are associated with a stored feature vector that is within a threshold Euclidean distance of at least one of the one or more query feature vectors.

7. The computer-implemented method of claim 5, wherein the one or more query feature vectors comprise one or more of color features, pattern features, texture features, edge features, area features, or gradient features.

8. The computer-implemented method of claim 5, wherein the image comprises a first set of colors, and further comprising:
performing color quantization on the first set of colors to reduce the first set of colors to a reduced set of colors;
generating a histogram identifying a frequency of the reduced set of colors in the image; and
selecting a threshold number of colors of the reduced set of colors as the first plurality of visual attributes.

9. The computer-implemented method of claim 5, wherein determining the second plurality of visual attributes based on the visual attribute scheme further comprises:
determining that a difference between one visual attribute of the first plurality of visual attributes and a visual attribute of the visual attribute scheme is below a threshold difference; and
modifying the one visual attribute to match the visual attribute of the visual attribute scheme.

10. The computer-implemented method of claim 5, wherein the image is associated with a customer of an electronic marketplace, and further comprising adding visual attributes to the second plurality of visual attributes, wherein the added visual attributes match the visual attribute scheme and are determined based on at least one of a purchase history of the customer, a segment to which the customer belongs, or an indication received by the customer.

11. The computer-implemented method of claim 5, wherein the electronic catalog of items comprises apparel items each having an associated category and being associated with a body location on which the apparel item is worn, and further comprising:
determining a respective location in the image for each of the one or more regions of the image;
determining, for each of the one or more regions of the image, a subset of the visually similar items that each (a) are associated with a stored feature vector that corresponds to the query feature vector for the respective region of the image and (b) are associated with a body location that corresponds to a location of the respective region in the image; and
providing a proposed outfit of apparel items, the proposed outfit comprising a visually similar item of the subset of the visually similar items for each of the one or more regions of the image.

12. The computer-implemented method of claim 11, wherein the query feature vectors are based on a characteristic of pixels of the image, and further comprising:
determining that a first region of the image and a second region of the image have corresponding respective locations in the image;
determining a number of pixels in the first and second regions having the respective characteristic, wherein the first region has a greater number of pixels of the respective characteristic;
modifying the proposed outfit, wherein the visually similar item for the first region has a first category and the visually similar item for the second region has a second category.

13. The computer-implemented method of claim 5, wherein the query feature vectors and the stored feature vectors are based on color, wherein the electronic catalog of items comprises apparel items associated with a category, and further comprising:
determining, for a first category of apparel items, a first color of the apparel items that appears most frequently in the first category;
determining that one of the query feature vectors corresponds to the first color of the apparel items that appears most frequently in the first category;
providing a proposed outfit of apparel items, the proposed outfit comprising an apparel item of the first category in the first color.

14. The computer-implemented method of claim 5, wherein the attribute value corresponds to a color in a color space comprising one of RGB, CIE, CMYK, HSL, or HSV.

15. The computer-implemented method of claim 5, wherein the potential visual attribute schemes comprise color schemes, at least two of the color schemes being a monochromatic color scheme, an analogous color scheme, a complementary color scheme, a split complementary color scheme, a triadic color scheme, a tetradic color scheme, and a square color scheme.

16. The computer-implemented method of claim 5, wherein the visual attributes comprise one or more of color, texture, surface pattern, material, lighting field, spectral properties, or reflectance properties.

17. The computer-implemented method of claim 5, further comprising:
determining location data in the image corresponding to each of the one or more regions;
determining a correspondence between each of the visually similar items and location data for each of the one or more respective regions corresponding to a query feature vector used to identify one of the visually similar items; and
arranging the visually similar items in the image according to the correspondence.

18. A system, comprising:
at least one processor; and
memory including instructions that, when executed by the at least one processor, enable the system to:
obtain an image;
determine a frequency at which a first plurality of colors appear in the image, each of the first plurality of colors represented by a color value;
identify a color scheme based on a comparison of the frequency of each color of the first plurality of colors appearing in the image to a plurality of potential color schemes;
determine a second plurality of colors based on the color scheme;
determine candidate regions of the image, each candidate region containing at least one of the second plurality of colors;
select one or more regions of the image from the candidate regions;
determine one or more query feature vectors from each of the one or more regions;
compare the one or more query feature vectors against an electronic catalog of items having stored feature vectors; and
identify visually similar items in the electronic catalog, wherein the visually similar items are associated with stored feature vectors that correspond to one of the query feature vectors.

19. The system of claim 18, wherein the instructions when executed further enable the system to:
- use a trained neural network to identify the one or more query feature vectors, the trained neural network having been used to generate the stored feature vectors,
- wherein the visually similar items are associated with a stored feature vector that is within a threshold Euclidean distance of at least one of the one or more query feature vectors.

20. The system of claim 18, wherein the electronic catalog of items comprises apparel items each having an associated category and being associated with a body location on which the apparel item is worn, and wherein the instructions when executed further enable the system to:
- determine a respective location in the image for each of the one or more regions of the image;
- determine, for each of the one or more regions of the image, a subset of the visually similar items that each (a) are associated with a stored feature vector that corresponds to the query feature vector for the respective region of the image and (b) are associated with a body location that corresponds to a location of the respective region in the image; and provide a proposed outfit of apparel items, the proposed outfit comprising a visually similar item of the subset of the visually similar items for each of the one or more regions of the image.

* * * * *